US008106639B1

(12) United States Patent
Ju et al.

(10) Patent No.: US 8,106,639 B1
(45) Date of Patent: Jan. 31, 2012

(54) FEED FORWARD CONTROL OF SWITCHING REGULATOR

(75) Inventors: Shu-Ing Ju, Palo Alto, CA (US);
Jayendar Rajagopalan, Newcastle, WA (US); Rajarshi Paul, Boulder, CO (US);
Jeffry Mark Huard, Puyallup, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 852 days.

(21) Appl. No.: 12/136,010

(22) Filed: Jun. 9, 2008

(51) Int. Cl.
*G05F 1/40* (2006.01)

(52) U.S. Cl. ....................................................... 323/282

(58) Field of Classification Search .................. 323/271, 323/282–288, 351
See application file for complete search history.

(56) References Cited

U.S. PATENT DOCUMENTS

| | | | |
|---|---|---|---|
| 4,809,150 A | 2/1989 | Limuti et al. | |
| 5,949,224 A | 9/1999 | Barkaro et al. | |
| 6,166,527 A | 12/2000 | Dwelley et al. | |
| 6,166,926 A * | 12/2000 | Nath et al. | 363/21.03 |
| 6,348,781 B1 | 2/2002 | Midya et al. | |
| 6,515,457 B1 | 2/2003 | Maniktala | |
| 6,538,419 B1 * | 3/2003 | Allen et al. | 323/285 |
| 6,593,725 B1 * | 7/2003 | Gallagher et al. | 323/284 |
| 6,897,723 B2 * | 5/2005 | Gentzler | 330/151 |
| 6,900,624 B2 | 5/2005 | Abo et al. | |
| 6,952,355 B2 * | 10/2005 | Riggio et al. | 363/21.15 |
| 6,975,525 B2 * | 12/2005 | Kernahan | 363/98 |
| 7,026,800 B2 | 4/2006 | Liu et al. | |
| 7,129,680 B2 | 10/2006 | Higashitani et al. | |
| 7,598,715 B1 * | 10/2009 | Hariman et al. | 323/271 |
| 7,868,603 B2 * | 1/2011 | Lacombe et al. | 323/285 |
| 2009/0015217 A1 * | 1/2009 | Harriman | 323/266 |

OTHER PUBLICATIONS

Sahu et al., "A High-Efficiency WCDMA RF Power Amplifier With Adaptive, Dual-Mode Buck-Boost Supply and Bias-Current Control," IEEE Microwave and Wireless Components Letters, vol. 17, No. 3, Mar. 2007, pp. 238-240.
LTC3440 Data Sheet, "Micropower Synchronous Buck-Boost DC/DC Converter," Linear Technology Corporation (2001).
Chen et al., "Buck-Boost PWM Converters Having Two Independently Controlled Switches," 2001 IEEE 32nd Annual Power Electronics Specialists Conference (PESC), 2(17-21):736-741 (2001).
Cheng et al., "Chaos Study and Parameter-Space Analysis of the DC-DC Buck-Boost Converter," IEE Proc.-Electr. Power Appl., 150(2):126-138 (2003).
Feng et al., "An Adaptive Current Mode Fuzzy Logic Controller for DC-to-DC Converters," 2003 IEEE Applied Power Electronics Conference (APEC), pp. 983-989 (2003).

(Continued)

*Primary Examiner* — Adolf Berhane
(74) *Attorney, Agent, or Firm* — Frommer Lawrence & Haug LLP; Matthew M. Gaffney

(57) ABSTRACT

The invention relates to a switching regulator with an error amplifier circuit and a feed-forward circuit. The error amplifier circuit provides an error signal by amplifying the difference between a feedback signal and a reference signal. The feed-forward circuit level-shifts the output of the error amplifier based on the feed-forward input signal and a scaling factor. The resulting adjusted error signal includes both feedback and feed-forward signal components. A PWM comparator is employed to compare the adjusted error signal to a ramp signal. Switched-mode regulation is performed based on the PWM comparator output. In addition, buck-boost mode transition smoothing circuitry may also be employed to smooth the buck-mode/boost-mode transition in a buck-boost switching regulator.

33 Claims, 13 Drawing Sheets

OTHER PUBLICATIONS

Gaboriault et al., "A High Efficiency, Non-Inverting, Buck-Boost DC-DC Converter," 2004 19th Annual IEEE Applied Power Electronics Converence and Exposition (APEC '04), 3:1411-1415 (2004).

Midya et al., "Tracking Power Converter for Supply Modulation of RF Power Amplifiers," 2001 IEEE 32nd Annual Power Electronics Speialists Conference (PESC), 3(17-21):1540-1545 (2001).

Midya et al., "Buck or Boost Tracking Power Converter," IEEE Power Electronics Letters, 2(4):131-134 (2004).

Nguyen et al., "A Tracking Control Method for Boost and Buck-Boost Converters Using Input Current Prediction and Load Current Feedforward," 1997 28th Annual IEEE Power Electonics Specialists Conference (PESC), 1 (22-27):189-196 (1997).

Rogers, E., "Understanding Buck-Boost Power Stages in Switch Mode Power Supplies," Texas Instruments, Application Report, SLUA059A, pp. 1-32 (2002).

Sahu et al., "A High-Efficiency Linear RF Power Amplifier with a Power-Tracking Dynamically Adaptive Buck-Boost Supply," IEEE Transactions on Microwave Theory and Techniques, 52(1):112-120 (2004).

Sahu et al., "A Low Voltage, Dynamic, Noninverting, Synchronous Buck-Boost Converter for Portable Applications," IEEE Transactions on Power Electronics, 19(2):443-452 (2004).

Liqing et al., "Computation of Lyapunov Exponents for a Current-Programmed Buck-Boost Converter," 2nd International Workshop on Autonomous Decentralized System, 6-7:273-276 (2002).

Chakraborty et al., "Combination of Buck and Boost Modes to Minimize Transients in the Output of a Positive Buck-Boost Converter," IEEE 2006. pp. 2372-2377.

Yang et al., "Feed-Forward Pulse Width Modulation for High Line Regulation Buck or Boost Converters," IEEE 2007, pp. 785-788.

LM 3668: 1A, High Efficiency Dual Mode Single Inductor Buck-Boost DC/DC Converter, National Semiconductor Corporation, May 22, 2008, 18 pgs.

LM3668 Evaluation Board, AN 1623, National Semiconductor Corporation, May 22, 2008, 6 pgs.

* cited by examiner

US 8,106,639 B1

FEED FORWARD CONTROL OF SWITCHING REGULATOR

TECHNICAL FIELD

The invention is generally directed to the area of power regulation. The invention is directed, particularly, but not exclusively to improving the transient response of a regulator.

BACKGROUND

Switching regulators are typically employed to provide a substantially constant output voltage or output current over a range of input voltages, input disturbances, output load changes, and/or the like. Commonly, switched regulators employ negative-feedback to compare an output voltage and/or output current to a reference signal. The closed-loop negative-feedback system of switched regulators enables relatively high efficiency power conversion.

Switched regulators such as buck regulators, boost regulators, buck-boost regulators, switched capacitor regulators, and/or the like, are typically arranged to selectively transfer energy into or out of energy storage components such as inductors and capacitors.

In a typical buck-boost topology, in buck/boost mode the boost switches and the buck switches are switching during the same cycle. A buck-or-boost (BOB) regulator operates in two modes: boost mode or buck mode. Typically, in a BOB regulator, the input voltage is compared to the desired output voltage, and the circuit operates in either buck mode or boost mode depending on the result of the comparison. However, conventional BOB regulators typically have glitches or other problems that occur when transitioning from buck mode to boost mode or vice versa.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
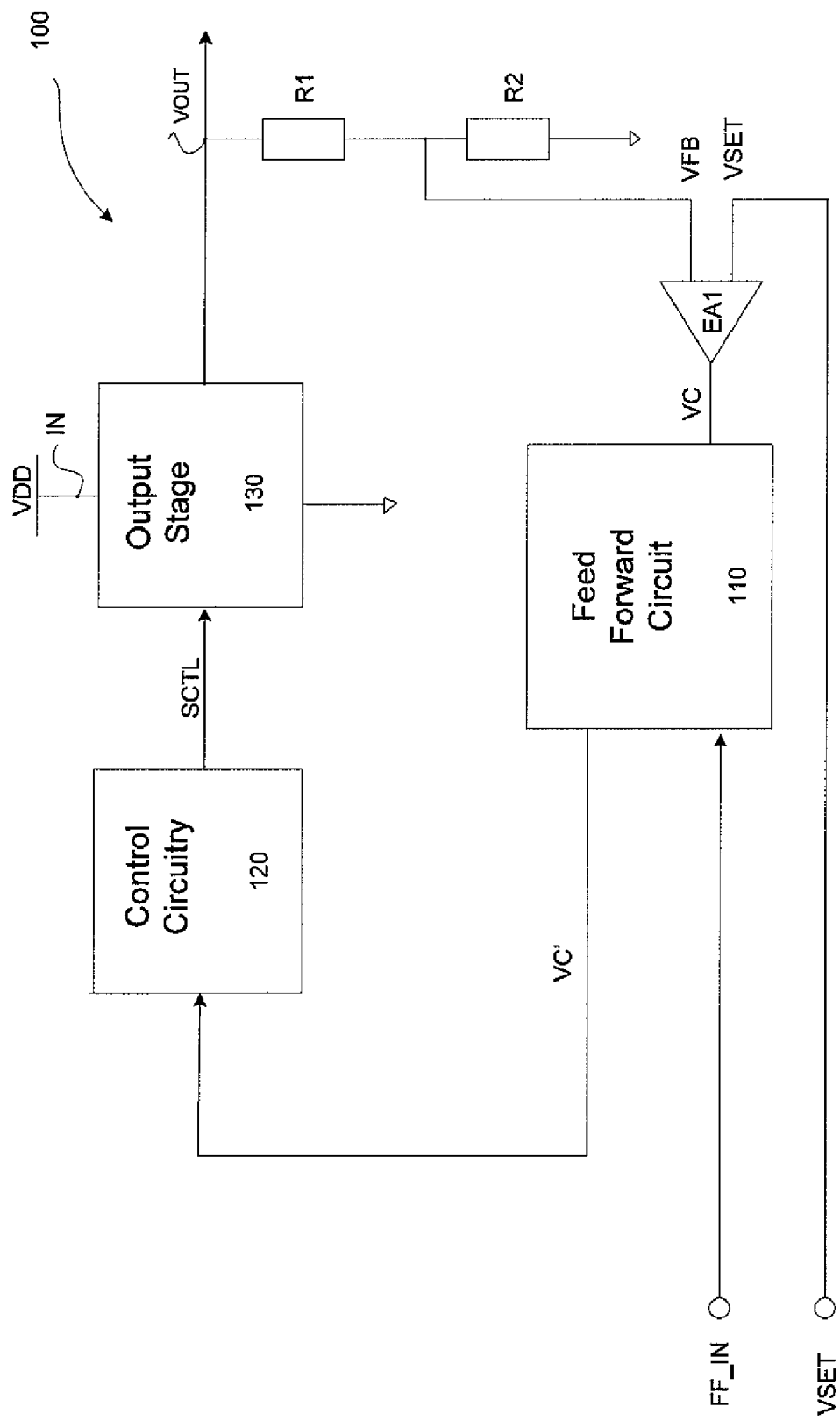
FIG. 1 is a block diagram of an illustrative embodiment of a regulator circuit according to aspects of the present invention.

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part, on" and includes being based on additional factors, some of which are not described herein. The term "coupled" means at least either a direct electrical connection between the items connected, or an indirect connection through one or more passive or active intermediary devices.

The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. A "signal" may also be employed to provide and/or transmit power. Where either a field effect transistor (FET) or a bipolar transistor may be employed as an illustrative embodiment of a transistor, the scope of the words "gate", "drain", and "source" includes "base", "collector", and "emitter", respectively, and vice versa. The phrase "in one embodiment," as used herein does not necessarily refer to the same embodiment, although it may.

Briefly stated, the invention relates to a switching regulator with an error amplifier circuit and a feed-forward circuit. The error amplifier circuit provides an error signal by amplifying the difference between a feedback signal and a reference signal. The feed-forward circuit level-shifts the output of the error amplifier based on the feed-forward input signal and a scaling factor. The resulting adjusted error signal includes both feed-back and feed-forward signal components. A PWM (Pulse Width Modulation) comparator is employed to compare the adjusted error signal to a ramp signal. Switched-mode regulation is performed based on the PWM comparator output. In addition, buck-boost mode transition smoothing circuitry may also be employed to smooth the buck-mode/boost-mode transition in a buck-boost switching regulator.

FIG. 1 is a block diagram of an illustrative embodiment of regulator 100. Regulator 100 includes feed-forward circuit 110, control circuitry 120, output stage 130, resistor R1, resistor R2, and error amplifier EA1.

Regulator 100 is arranged to regulate output voltage VOUT to a substantially constant voltage over a range of input voltages of input voltage VDD. For example, regulator 100 may be arranged to regulate output voltage VOUT to +12 volts, +3.3 volts, +1.8 volts, −5 volts, and/or the like. In addition, regulator 100 is arranged provide feed-forward regulation of output voltage VOUT based, in part, on feed-forward input signal FF_IN.

Control circuitry 120 is arranged to receive adjusted error signal VC' and to provide switch control signals SCTL_1-SCTL_4 based, at least in part, on adjusted error signal VC'. Output stage 130 is arranged to receive input voltage VDD and switch control signals SCTL_1-SCTL_4. Output stage 130 is further arranged to provide output voltage VOUT from input voltage VDD based, at least in part, on switch control signals SCTL_1-SCTL_4.

As illustrated, output stage 130 is coupled to positive input voltage VDD and to ground. However, in other illustrative embodiments, output stage 130 may be coupled between a positive input power supply and a negative input power supply, between ground and a negative power supply, between two positive power supplies, and/or the like.

Feedback voltage divider resistors R1 and R2 are arranged to receive output voltage VOUT and to provide feedback signal VFB to error amplifier EA1. The values of resistors R1 and R2 may be selected to regulate the output voltage VOUT to any value. In other illustrative embodiments, other feedback and/or sense circuits may be suitably employed to provide similar functionality. For example, these circuits include current sense resistors, feedback amplifier circuits, transformers, hall-effect sensors, digital feedback control circuits, reference signal voltage divider, a reference signal amplifier circuit, a feedback signal amplifier circuit, and/or the like. In yet another illustrative embodiment, feedback signal VFB is provided directly from output voltage VOUT.

Error amplifier EA1 is arranged to receive feedback signal VFB, to receive set-point signal VSET, and to provide error signal VC. In one illustrative embodiment, error amplifier circuit EA1 is arranged to provide error signal VC based, at least in part, on the difference between feedback signal VFB and set-point signal VSET. In addition, error amplifier EA1 may include compensation circuitry, and/or the like.

In one illustrative embodiment, set-point signal VSET is employed as a set-point signal to define the value to which output voltage VOUT is regulated to. In one illustrative embodiment, set-point signal VOUT is provided by a reference generator circuit such as a band-gap reference circuit. In other illustrative embodiments, regulators, Zener diodes, gas-filled tubes, digital-to-analog converters, and/or the like, may be suitably employed, instead of, or in conjunction with, a band-gap circuit.

In one illustrative embodiment, set-point signal VSET is a user controllable signal which may be changed, for example, to change the value of output voltage VOUT. In such an embodiment, set-point signal VSET may be provided by a digital-to-analog converter, a potentiometer, and/or the like.

Feed-forward circuit 110 is arranged to receive error signal VC and to receive feed-forward input signal FF_IN. Feed-forward circuit 110 is further arranged to provide adjusted error signal VC' based, at least in part, on error signal VC and feed-forward input signal FF_IN. In one illustrative embodiment, feed-forward circuit 110 is arranged to provide a pre-defined adjustment of error signal VC on adjusted error signal VC' for a given value of feed-forward input signal FF_IN. For example, in one embodiment, feed-forward circuit 110 is arranged to provide adjusted error signal VC' by level-shifting error signal VC by an amount that is based on feed-forward input signal FF_IN.

In one illustrative embodiment, feed-forward circuit 110 is arranged to provide feed-forward adjustment of adjusted error signal VC' such that the lag time between a change on feed-forward input signal FF_IN and the corresponding change to output voltage VOUT is reduced. For example, feed-forward circuit 110 may enable regulator 100 to respond to feed-forward input signal FF_IN changes without the delay commonly associated with feedback regulation systems. For instance, if feed-forward circuit 110 is employed in a switching regulator, the regulator may be enabled to respond to feed-forward input signal FF_IN changes without the delays which are typically associated the inductor(s) and/or capacitor(s), of certain switching regulator topologies.

In other illustrative embodiments, regulator 100 differs from the described embodiments. For example, feed-forward circuit 110 may be arranged to provide a feed-forward adjustment of a feedback signal instead of an error signal. Further, feed-forward input signal FF_IN, set-point signal VSET, and/or the like may be provided via a voltage divider, buffer, gain circuit, and/or the like. In addition, control circuitry 120 may be arranged to receive an enable signal, mode control signal, and/or the like.

Further, regulator 100 may be a buck-mode, a boost-mode regulator, a fly-back regulator, a buck-boost regulator, a linear regulator, a half-bridge regulator, a full-bridge regulator, a switched capacitor regulator, an inverting regulator, and/or the like. Likewise, although described as a voltage mode controlled voltage regulator, regulator 100 may be either a current regulator and/or a voltage regulator, and may employ either current mode and/or voltage mode control. Moreover, if regulator 100 is a switching regulator, it may be a pulse-width modulated (PWM), pulse-frequency modulated (PFM), a PWM/PFM hybrid, and/or the like. Likewise, switching regulator embodiments of regulator 100 may be synchronously or asynchronously rectified. These and other variations are within the spirit and scope of the invention.

Figure 2:
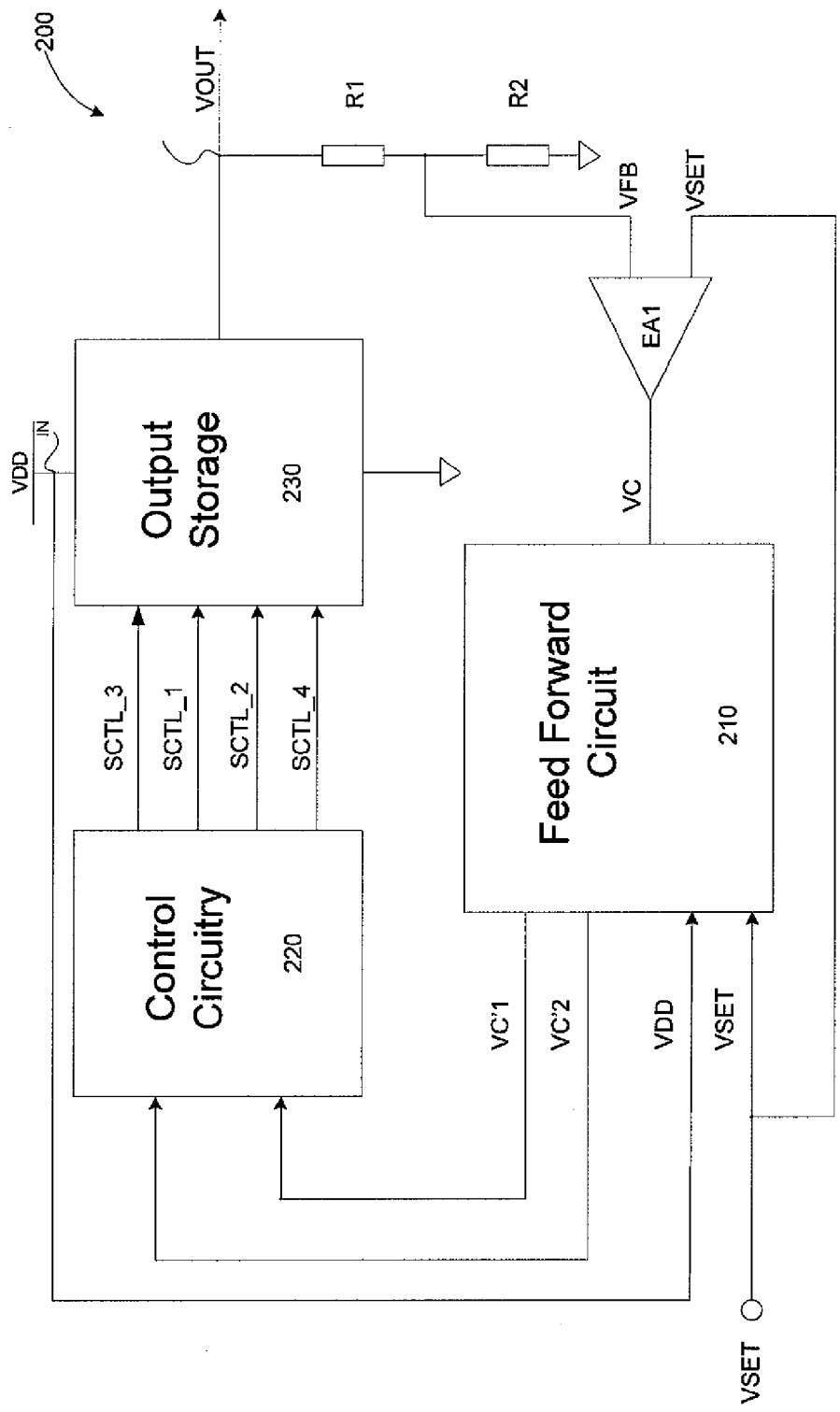
FIG. 2 is a block diagram of illustrative embodiment of another regulator circuit according to aspects of the present invention.

FIG. 2 is a block diagram of an embodiment of regulator 200. Regulator 200 includes feed-forward circuit 210, control circuitry 220, output stage 230, resistor R1, resistor R2, and error amplifier EA1. Regulator 200 is arranged to regulate output voltage VOUT to a substantially constant voltage over a range of input voltages of input voltage VDD. Regulator 200 may be employed as an embodiment of regulator 100 of FIG. 1.

Control circuitry 220, output stage 230, resistor R1, resistor R2, and error amplifier EA1 may be employed as respective embodiments of control circuitry 120, output stage 130, resistor R1, resistor R2, and error amplifier EA1 of FIG. 1. In one embodiment, regulator 200 is a synchronously rectified buck-boost switching regulator.

Feed-forward circuit 210 is arranged to receive error signal VC, to receive input voltage VDD as a feed-forward input signal and to receive set-point signal VSET as another feedforward input signal. Feed-forward circuit 210 is further arranged to provide signals VC'1 and VC'2 based, at least in part, on error signal VC, input voltage VDD, and set-point signal VSET. In one embodiment, input voltage VDD is an embodiment of feed-forward input signal FF_IN of FIG. 1. Likewise, in one embodiment, set-point signal VSET is another illustrative embodiment of feed-forward input signal FF_IN of FIG. 1.

In one embodiment, feed-forward circuit 210 is arranged to provide feed-forward adjustment of an internal reference voltage (not shown in FIG. 2) such that any disturbance due to a change on input voltage VDD is reduced. For example, if error signal VC is employed to control the regulation provided by regulator 200, a change to input voltage VDD (due to, for example, battery discharge, battery charging, output current changes, and/or the like) may result in a disturbance on output voltage VOUT. The duration of this disturbance is related, in part, to the feedback loop lag time through control circuitry 220, output stage 230, and error amplifier EA1.

The feed-forward adjustment based on input voltage VDD enables control circuitry 220 to provide a predetermined adjustment to the regulation of output voltage VOUT without the feedback delay through control circuitry 220, output stage 230, and error amplifier EA1. In one embodiment, this feed-forward adjustment enables a reduced disturbance on output voltage VOUT.

In one illustrative embodiment, feed-forward circuit 210 is further arranged to provide feed-forward adjustment of the internal reference voltage (not shown in FIG. 2) such that the response time to a change on set-point signal VSET is reduced. For example, if error signal VC is employed to control the regulation provided by regulator 200, a change to set-point signal VSET (due to, for example, a request to change output voltage VOUT) the resulting change to output voltage VOUT may be delayed by the feedback loop lag time through control circuitry 220, output stage 230, and error amplifier EA1.

The feed-forward adjustment based on set-point signal VSET enables control circuitry 220 to provide a predetermined adjustment to the regulation of output voltage VOUT without a feedback delay through control circuitry 220, output stage 230, and error amplifier EA1. In one embodiment, this feed-forward adjustment enables a decreased response time and/or improved step response to a change on set-point signal VSET.

Control circuitry 220 is arranged to receive signals VC'1 and VC'2. Control circuitry 220 is further arranged to provide switch control signals SCTL_1-SCTL_4 to output stage 230 based, at least in part, on signals VC'1 and VC'2. In one embodiment, output stage 230 is arranged to regulate output voltage VOUT based, at least in part, on switch control signals SCTL_1-SCTL_4.

In one illustrative embodiment, feed-forward circuit 210 and control circuitry 220 further include mode-transition smoothing circuitry to smooth the transition between buck-mode operation and boost-mode operation in a buck-boost switching regulator. In other embodiments, mode-transition smoothing circuitry may be omitted.

Figure 3:
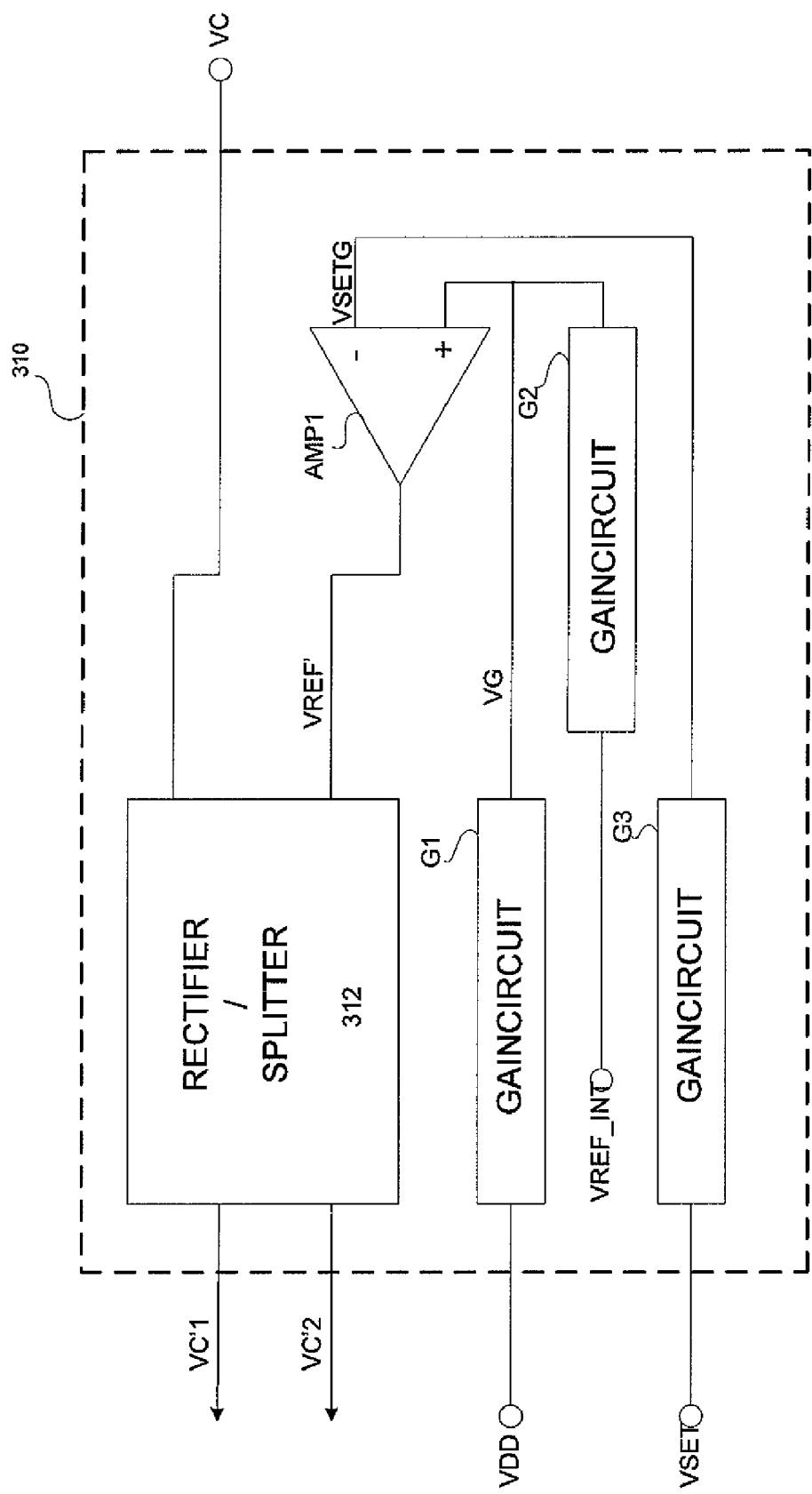
FIG. 3 is a schematic diagram of an illustrative embodiment of the feed-forward circuit of FIG. 2 according to aspects of the present invention.

FIG. 3 is a schematic diagram of an embodiment of feed-forward circuit 310. Feed-forward circuit 310 includes gain circuits G1, G2, and G3, amplifier AMP1, and rectifier/splitter 312. Feed-forward circuit 310 may be employed as an embodiment of feed-forward circuit 210 of FIG. 2.

Gain circuits G1 and G2 are arranged to provide scaled signal VG by multiplying input voltage VDD with constant K1, multiplying internal reference voltage VREF_INT with constant K2, and summing the results of the two multiplications. Likewise, gain circuit G3 is arranged to provide scaled set-point signal VSETG by multiplying set-point signal VSET with constant K3.

Gain circuits G1, G2, and G3 may be any suitable gain circuits. In one illustrative embodiment, gain circuits G1, G2, and G3 are non-inverting operational amplifier circuits. In other illustrative embodiments, gain circuits G1, G2, and G3 may be attenuation circuits, other operational amplifier circuits, and/or the like. In certain embodiments, one or more of gain circuits G1, G2, and G3 may be omitted.

Amplifier AMP1 is arranged to provide adjusted reference signal VREF' based, at least in part, on scaled signal VG and scaled set-point signal VSETG. In one embodiment, amplifier AMP1 is arranged to provide adjusted error signal VC' such that:

$$VREF'=(VG)-(VSETG),$$

where in VG=(VDD*K1+VREF_INT*K2) and VSETG=(VSET*K3). Accordingly, in this embodiment, feed-forward circuit 310 is arranged such that:

$$VREF'=(VDD*K1)+(VREF\_INT*K2)-(VSET*K3).$$

Any suitable circuit may be employed as amplifier AMP1. For example, operational amplifier circuits, summing amplifiers, level shifters, and/or the like, may be suitably employed.

In one illustrative embodiment, constants K1, K2, and K3 are predetermined constants. Each of constants K1, K2, and K3 may be less than one, greater than one, or substantially equal to one. In one embodiment, constants K1, K2, and K3 are predetermined based on the expected effect of a given change to input voltage VDD or set-point signal VSET on regulated output voltage VOUT. For example, constants K1, K2, and K3 may be calculated by simultaneously solving multiple equations which define values of output voltage VOUT for various values of input voltage VDD and set-point signal VSET. In one illustrative embodiment, the multiple equations are solved to determine a switching regulator PWM duty cycle to produce a given value of output voltage VOUT.

In one illustrative embodiment, constants K1, K2, and K3 are calculated to minimizing the output disturbance on regulated output voltage VOUT resulting from a fixed step on input voltage VDD over a wide operating range for output voltage VDD. In one embodiment, a voltage step may be fixed at approximately 0.6 volts. However, in other illustrative embodiments, constants K1, K2, and K3 may be calculated to minimize disturbances for voltage step changes of any magnitude.

In one embodiment, constants K1, K2, and K3 are calculated to reduce the variance on error signal VC and to improve the output dynamic range of an error amplifier (such as error amplifier EA1 of FIG. 2) over a wide operating range for output voltage VDD.

Rectifier/splitter 312 is arranged to provide signals VC'1 and VC'2 based, in part, on error signal VC and adjusted error signal VC'. Further, in one embodiment, rectifier/splitter 312 is operable to provide signals VC'1 and VC'2 such that they are proportional to the departure of error signal VC from a central value defined by adjusted reference signal VREF' but increasing in value from zero. Only one of the two signals VC'1 and VC'2 departs from zero depending on adjusted error signal VC' and adjusted reference signal VREF'.

Figure 4:
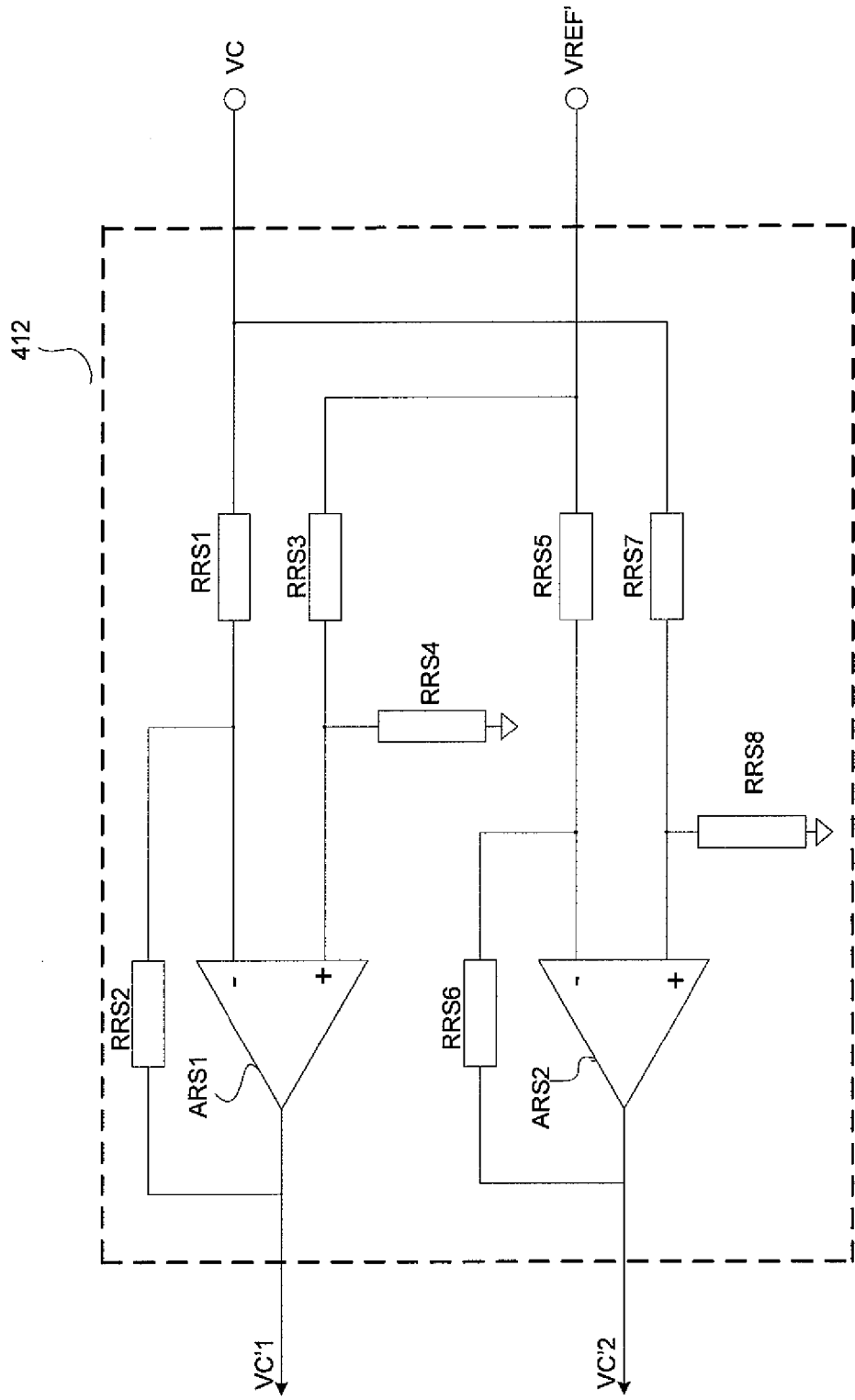
FIG. 4 is a schematic diagram of an illustrative embodiment of the rectifier/splitter of FIG. 3 according to aspects of the present invention.

FIG. 4 illustrates a schematic diagram of an embodiment of rectifier/splitter 412. Rectifier/splitter 412 includes resistors RRS1-RRS8, operational amplifier ARS1, and operational amplifier ARS2. Rectifier/splitter 412 may be employed as embodiment of rectifier/splitter 312 of FIG. 3.

Operational amplifier ARS1 and resistors RRS1-RRS4 are arranged to operate as a differential amplifier. Operational amplifier ARS2 and resistors RRS5-RRS8 are arranged to operate as another differential amplifier. However, error signal VC is applied to the inverting input of the differential amplifier that includes operational amplifier ARS1, so that signal VC'1 is inverted relative to error signal VC. Relative to error signal VC, signal VC'2 is level-shifted, amplified, and clamped such that voltage VC'2 cannot be lower than zero volts. Relative to error signal VC, signal VC'1 is inverted, level-shifted, amplified, and clamped such that signal VC'1 cannot be lower than zero volts. During buck mode, signal VC'1 reaches zero volts when the buck regulation reaches 100% duty cycle. Conversely, during boost mode, signal VC'2 reaches zero volts when the boost regulation reaches 0% duty cycle. In a pass-through transition between boost and buck modes, the voltage of signals VC'1 and VC'2 are both zero volts. Operation of rectifier/splitter 412 during the pass-through transition is discussed in further detail below, for one embodiment.

Adjusted reference voltage VREF' may be provided by amplifier AMP1 of FIG. 3, and/or the like.

Although a particular embodiment of rectifier/splitter 412 is illustrated in FIG. 4, other embodiments of the rectifier/splitter are within the scope and spirit of the invention.

Figure 5:
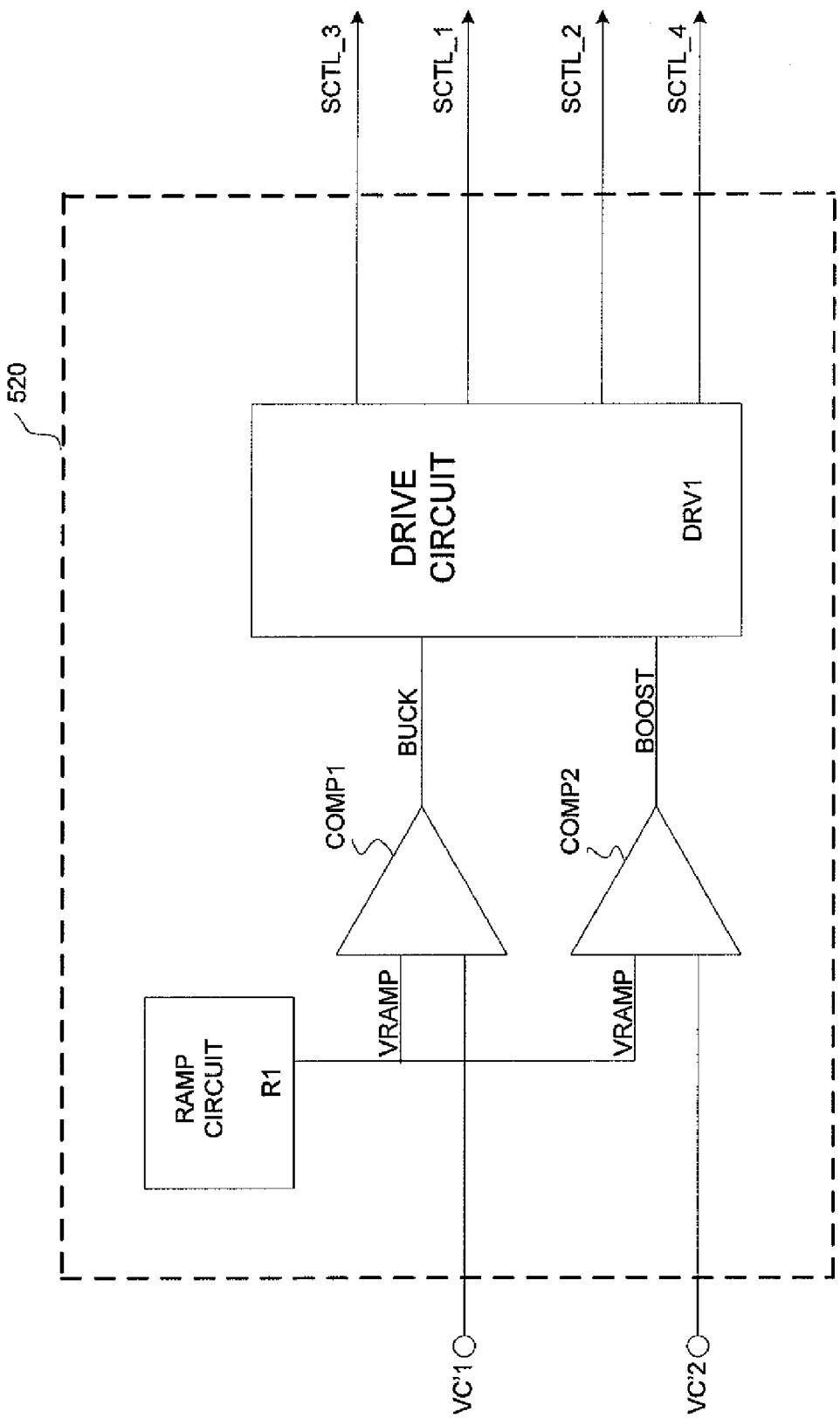
FIG. 5 is a schematic diagram of an embodiment of the control circuitry of FIG. 2 according to aspects of the present invention.

FIG. 5 is a schematic diagram of an embodiment of control circuitry 520. Control circuitry 520 includes ramp circuit R1, comparator COMP1, comparator COMP2, and drive circuit DRV1. Control circuitry 520 may be employed as an embodiment of control circuitry 220 of FIG. 2.

Figure 6:
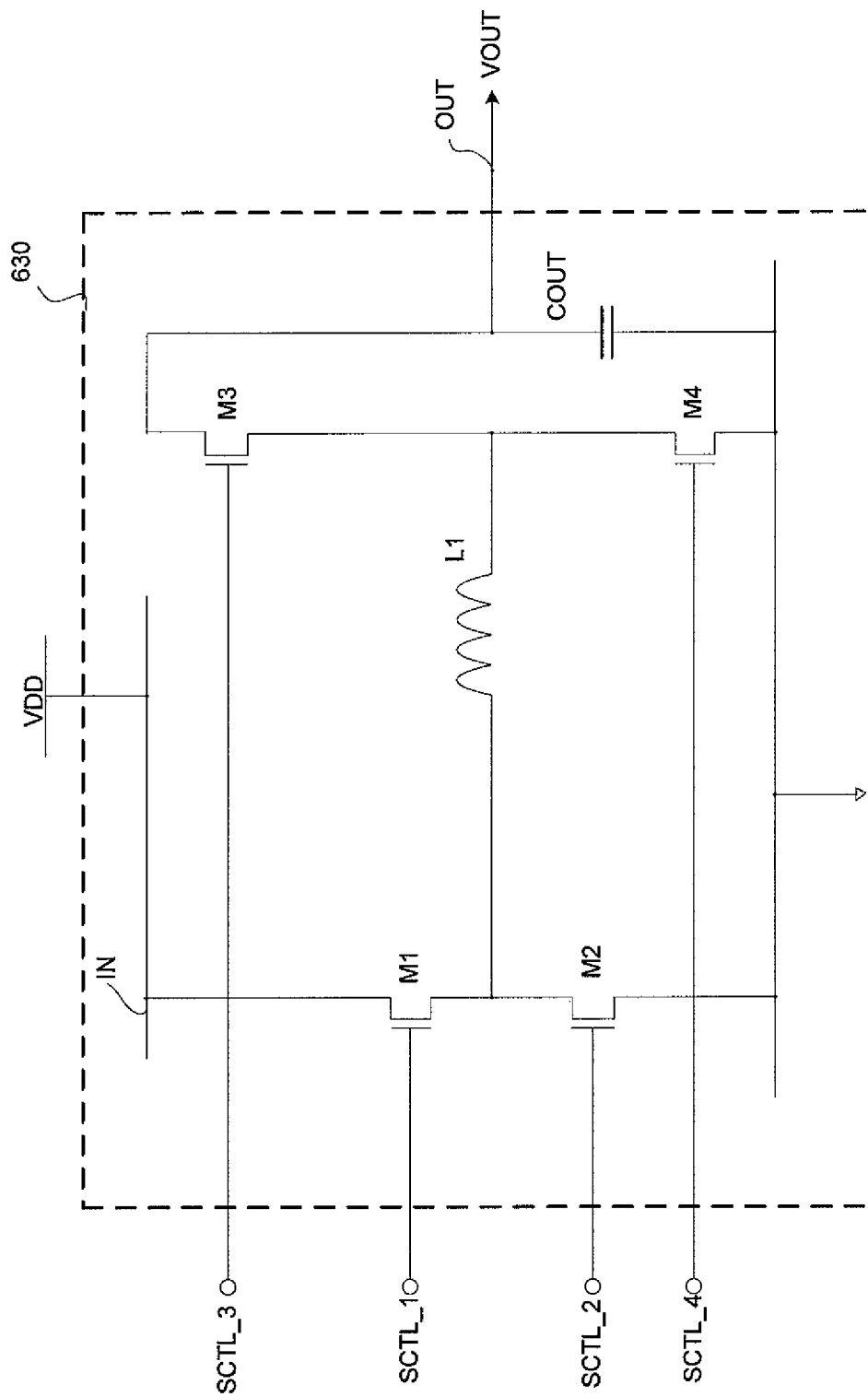
FIG. 6 is a schematic diagram of an illustrative embodiment of the output stage of FIG. 2 according to aspects of the present invention.

FIG. 6 is a schematic diagram of an embodiment of output stage 630. Output stage 630 includes transistors M1-M4, inductor L1, and capacitor COUT. Output stage 630 may be employed as an embodiment of output stage 230 of FIG. 2.

The aspects of control circuitry 520 and output stage 630, and the operation thereof, are discussed together, below, for one embodiment.

Control circuitry 520 is arranged to receive signals VC'1 and VC'2 and to provide switch control signals SCTL1-SCTL4 based, at least in part, on signals VC'1 and VC'2. Output stage 630 is arranged to regulated output voltage VOUT from input voltage VDD based, at least in part, on switch control signals SCTL1-SCTL4. In one illustrated embodiment, control circuitry 520 is arranged as a portion of a PWM modulated buck/boost regulator controller and output stage 630 is arranged as a portion of a PWM modulated buck/boost regulator. In one such embodiment, at any given time during operation, control circuitry 520 and output stage 630 operates in either buck mode or boost mode. Further, there is a brief transition period between the two modes during which the input voltage VDD at node IN is passed through to the output voltage VOUT at node OUT, so that no regulation is performed during the transition. In one embodiment, during the transition, switches M1 and M3 are closed, and switches M2 and M4 are open, so that node IN is coupled to node OUT via inductor L1.

During buck mode, control circuitry 520 controls the switches such that: switch M3 is always closed and switch M4 is always open. Also, control circuitry 520 controls switches M1 and M2 during buck regulation according to PWM buck switching regulation to provide regulated power signal VOUT.

During boost mode, control circuitry 520 controls the switches such that: switch M1 is always closed and switch M2 is always open. Also, control circuitry 520 controls switches M3 and M4 during boost regulation according to PWM boost switching regulation to provide regulated power signal VOUT.

In one embodiment, ramp circuit R1 is a modulation waveform generation circuit that generates ramp signal VRAMP. For example, ramp signal VRAMP may be a sawtooth waveform that linearly ramps from a value slightly greater than zero (e.g. 0.1 mV) to a maximum value related to the range of the control voltage and the desired minimum duty cycle.

Additionally, comparator COMP 1 is operable to compare signal VC'1 with ramp signal VRAMP, and to provide buck PWM signal BUCK based on the comparison. Similarly, comparator COMP2 is operable to compare signal VC'2 with ramp signal VRAMP, and to provide boost PWM signal BOOST based on the comparison. Also, drive circuit DRV1 is operable to drive switches M1, M2, M3, and M4 based on signals BOOST and BUCK.

Control circuitry 520 operates in two modes, buck and boost, and in one embodiment, the ripple is less than 30 mV during the mode transition.

Although a particular embodiment of control circuitry 520 and output stage 630 is illustrated in FIGS. 5 and 6, many variations of this circuit are within the scope and spirit of the invention. For example, in other embodiments, the logic shown may be reversed or otherwise modified from the exact logic shown. For example, each of switches M1-M4 may be selected to correspond to either an active high or an active low control signal. As another example, FIG. 6 illustrates an embodiment in which input voltage VDD is provided by a battery. However, in other embodiments, input voltage VDD may be provided from a source other than a battery. As yet another example, FIG. 6 illustrates a synchronously-rectified embodiment of output stage 630. In another embodiment, output stage 630 is an asynchronous-rectified regulator, and switches M2 and M4 are replaced with diodes. Further, illustrative embodiments of control circuitry 520 and output stage 630 may include more or less components than illustrated in FIGS. 5 and 6.

Additionally, although a sawtooth waveform has been described as the modulating PWM waveform, in other embodiments, the modulating waveform may be any waveform suitable as a pulse width modulating waveform, such as a triangle wave, or the like. Further, although particular embodiments of the switches M1, M2, M3, and M4 are shown in FIG. 6, other embodiments of the switches are within the scope and spirit of the invention. For example, although field effect transistors are illustrated in FIG. 6, in other embodiments, bipolar transistors or the like may instead by used. Also, either p-type transistors and/or n-type transistors, and vice versa, may be employed with suitable control logic. These embodiments and others are within the scope and spirit of the invention.

Figure 7:
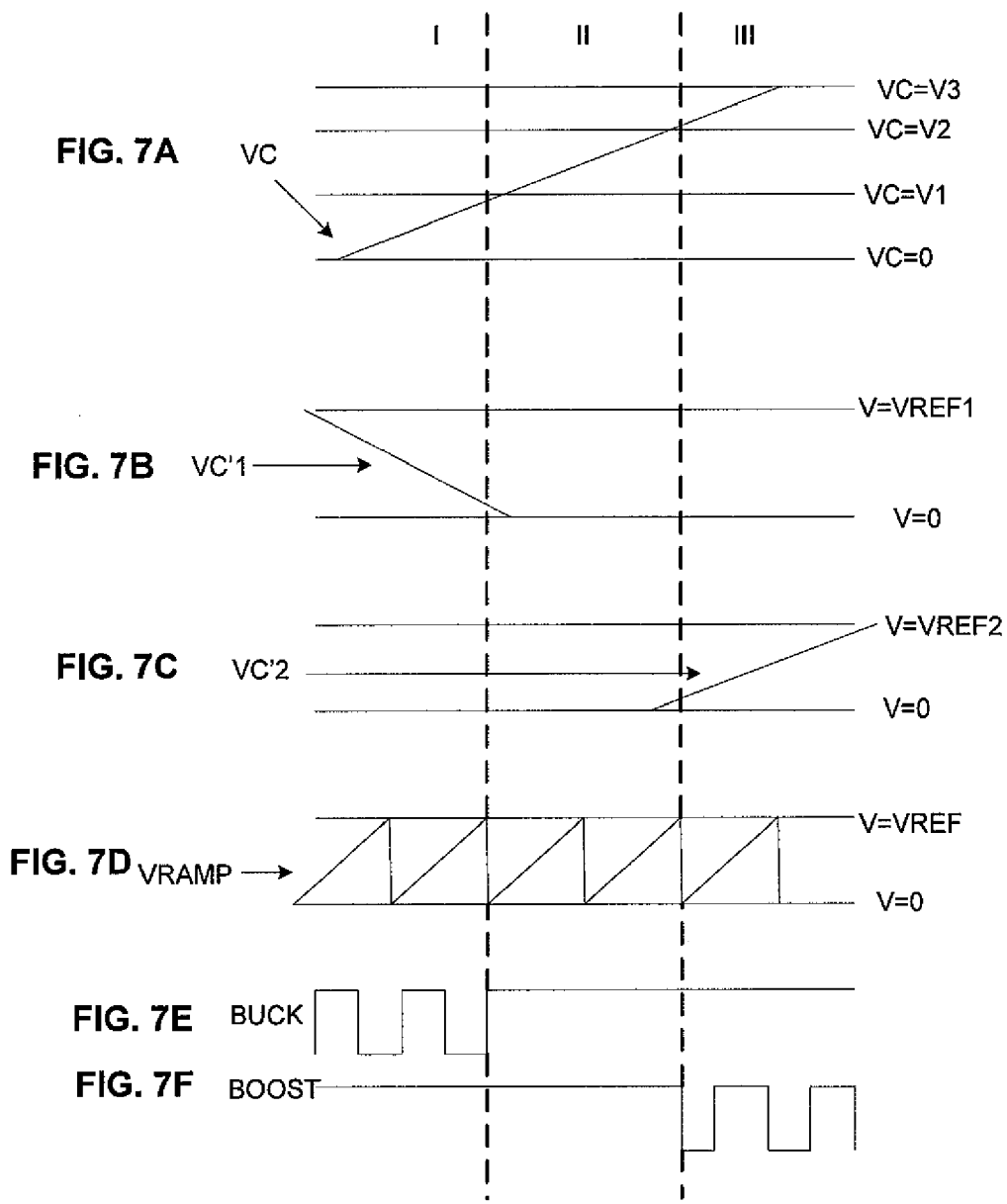
FIGS. 7A-7F are timing diagrams illustrating waveforms of illustrative embodiments of signals for an embodiment of the regulation system of FIGS. 2-6.

FIGS. 7A-7F shows a timing diagram of waveforms of embodiments of signals for an embodiment of the circuitry of FIGS. 2-6. Although FIGS. 7A-7F illustrate waveforms of particular embodiments of signals for one embodiment of the circuitry of FIGS. 2-6, the invention is not so limited. FIGS. 7A-7F are shown by way of example and illustration only. Other illustrative embodiments of circuitry having waveforms different than shown in FIGS. 7A-7F may be employed within the scope and spirit of the invention. FIG. 7A illustrates a timing diagram of a waveform an embodiment of error signal VC. FIG. 7B shows a timing diagram of a waveform an embodiment of signal VC' 1. FIG. 7C illustrates a timing diagram of a waveform an embodiment of signal VC'2. FIG. 7D shows a timing diagram of a waveform an embodiment of ramp signal VRAMP. FIG. 7E illustrates a timing diagram of a waveform an embodiment of signal BUCK. And, FIG. 7F shows a timing diagram of a waveform an embodiment of signal BOOST.

Region I represents buck mode operation, region III represents boost mode operation, and region II represents the mode transition between buck mode and boost mode operation. As shown in FIGS. 7A-7F, buck mode occurs when error signal VC is less than V1, boost mode occurs when error signal VC is greater than V2, and the mode transition occurs when error signal VC is greater than V1 but less than V2.

FIG. 7A shows error signal VC ramping upward. This may occur, for example, as a result of the input voltage VDD dropping. The PWM control signal BUCK of the input pair power switches is generated from signal VC'1 and from ramp signal VRAMP. At VC=0, control circuitry 420 is operating in buck mode and the duty cycle is zero. As error signal VC ramps upward from zero, signal VC'1 ramps downward from VREF1. As VC'1 ramps downward, the duty cycle of buck PWM signal BUCK increases. The duty cycle of signal BUCK is inversely proportional to VC'1. The duty cycle of signal BUCK reaches 100% when VC'1 reaches 0V. If error signal VC continuously ramp up and reaches V1, signal VC'1 will clamp at 0V. Signal VC'2 clamps at 0V if error signal VC is lower than V2. Accordingly, signal BOOST remains high throughout buck mode.

When error signal VC exceeds V1 (but is less than V2), VC'1 remains clamped at 0V, and VC'2 is also clamped at 0V. This is region II, the mode transition between buck and boost modes. Both signals BUCK and BOOST are high during the transition. During the mode transition, no regulation occurs, and input voltage VDD is coupled to output node OUT. Switches M1 and M3 remain closed during the mode transition. The transition prevents the condition of switching input and output power switches simultaneously. Accordingly, control circuitry 520 does not operate in buck/boost mode. It is desirable to not have the transition voltage range V2-V1 be too large, but to be a sufficient voltage range to ensure that, over process variation, BUCK and BOOST do not switch at the same time. In one embodiment, control of the transition region between modes is made relatively precise by adjusting the value of V1 and offsetting the inputs of the comparator.

In a preferred embodiment, although the invention is not so limited, the mode transition occurs when VC'1 and VC'2 are both below VRAMP, as opposed to an embodiment in which the logic is reversed in such a way that the mode transition occurs when VC'1 and VC'2 are both above VRAMP. In this way, V2-V1 is independent of the VRAMP peak value. Normally the peak of the ramp can vary considerably over the variation of supply voltage and ambient temperature. In an alternative embodiment in which the transition region occurs when VC'1 and VC'2 reach above the peak of VRAMP, then V2-V1 depends on the peak value of VRAMP and has larger variation.

Although the pass-through condition (region II), is described as a mode transition, it is not necessarily the case that the regulator must transition to the opposite mode when region II is entered. For example, if the regulator is operating in region I, and later passes into region II, it is not necessarily the case that the regulator will transition into region III. It is also possible that the regulator may return to region I, and may then either remain in region I or oscillate back and forth between region I and II for a time.

Signal VC'2 is clamped at zero as long as error signal VC is less than V2. Further, signal VC'2 follows error signal VC if error signal VC is greater than V2. The PWM control signal BOOST of the output pair power switches are generated from VC'2 and VRAMP. Additionally, the duty cycle of BOOST is inversely proportional to VC'2. Signal BOOST reaches 100% duty cycle when VC'1 is at 0V. As error signal VC increases above V2, the duty cycle of BOOST decreases. In one embodiment, there is a minimum duty cycle (e.g. 25%) for signal BOOST at VC=V3.

Figure 8:
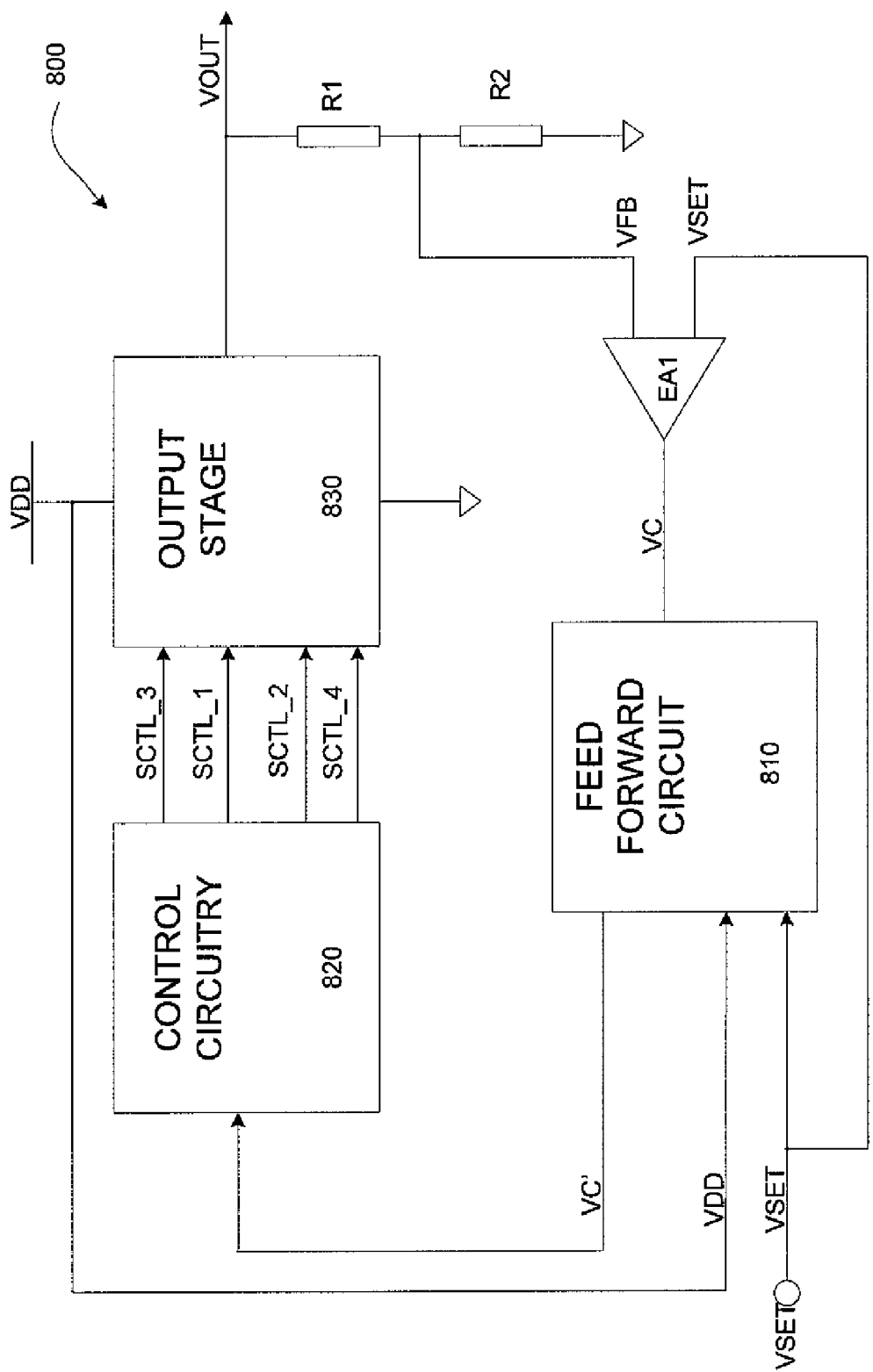
FIG. 8 is a block diagram of illustrative embodiment of yet another regulator circuit according to aspects of the present invention.

FIG. 8 is a block diagram of an embodiment of regulator 800. Regulator 800 includes feed-forward circuit 810, control circuitry 820, output stage 830, resistor R1, resistor R2, and error amplifier EA1. Regulator 800 is arranged to regulate output voltage VOUT to a substantially constant voltage over a range of input voltages of input voltage VDD. Regulator 800 may be employed as an embodiment of regulator 100 of FIG. 1.

Control circuitry 820, output stage 830, resistor R1, resistor R2, and error amplifier EA1 may be employed as respective embodiments of control circuitry 120, output stage 130, resistor R1, resistor R2, and error amplifier EA1 of FIG. 1. In one embodiment, regulator 800 is a synchronously rectified buck-boost switching regulator.

Feed-forward circuit 810 is arranged to receive error signal VC, to receive input voltage VDD as a feed-forward input signal and to receive set-point signal VSET as another feed-forward input signal. Feed-forward circuit 810 is further arranged to provide adjusted error signal VC' based, at least in part, on error signal VC, input voltage VDD, and set-point signal VSET. In one embodiment, input voltage VDD is an embodiment of feed-forward input signal FF_IN of FIG. 1. Likewise, in one embodiment, set-point signal VSET is another embodiment of feed-forward input signal FF_IN of FIG. 1.

In one illustrative embodiment, feed-forward circuit 810 is arranged to provide feed-forward adjustment of adjusted error signal VC' such that any disturbance due to a change on input voltage VDD is reduced. For example, if error signal VC is employed to control the regulation provided by regulator 800, a change to input voltage VDD (due to, for example, battery discharge, battery charging, output current changes, and/or the like) may result in a disturbance on output voltage VOUT. The duration of this disturbance is related, in part, to the feedback loop lag time through control circuitry 820, output stage 830, and error amplifier EA1.

The feed-forward adjustment based on input voltage VDD enables control circuitry 820 to provide a predetermined adjustment to the regulation of output voltage VOUT without a feedback delay through control circuitry 820, output stage 830, and error amplifier EA1. In one embodiment, this feed-forward adjustment enables a reduced disturbance on output voltage VOUT.

In one illustrative embodiment, feed-forward circuit 810 is further arranged to provide feed-forward adjustment of adjusted error signal VC' such that the response time to a change on set-point signal VSET is reduced. For example, if error signal VC is employed to control the regulation provided by regulator 800, a change to set-point signal VSET (due to, for example, a request to change output voltage VOUT) the resulting change to output voltage VOUT may be delayed by the feedback loop lag time through control circuitry 820, output stage 830, and error amplifier EA1.

The feed-forward adjustment based on set-point signal VSET enables control circuitry 800 to provide a predetermined adjustment to the regulation of output voltage VOUT without a feedback delay through control circuitry 820, output stage 830, and error amplifier EA1. In one embodiment, this feed-forward adjustment enables a decreased response time and/or improved step response to a change on set-point signal VSET.

Control circuitry 820 is arranged to receive adjusted error signal VC'. Control circuitry 820 is further arranged to provide switch control signals SCTL_1-SCTL_4 to output stage 830 based, at least in part, on adjusted error signal VC'. In one embodiment, output stage 830 is arranged to regulate output voltage VOUT based, at least in part, on switch control signals SCTL_1-SCTL_4.

In one illustrative embodiment, feed-forward circuit 810 and control circuitry 820 further include mode-transition smoothing circuitry to smooth the transition between buck-mode operation and boost-mode operation in a buck-boost switching regulator. In other embodiments, mode-transition smoothing circuitry may be omitted.

Figure 9:
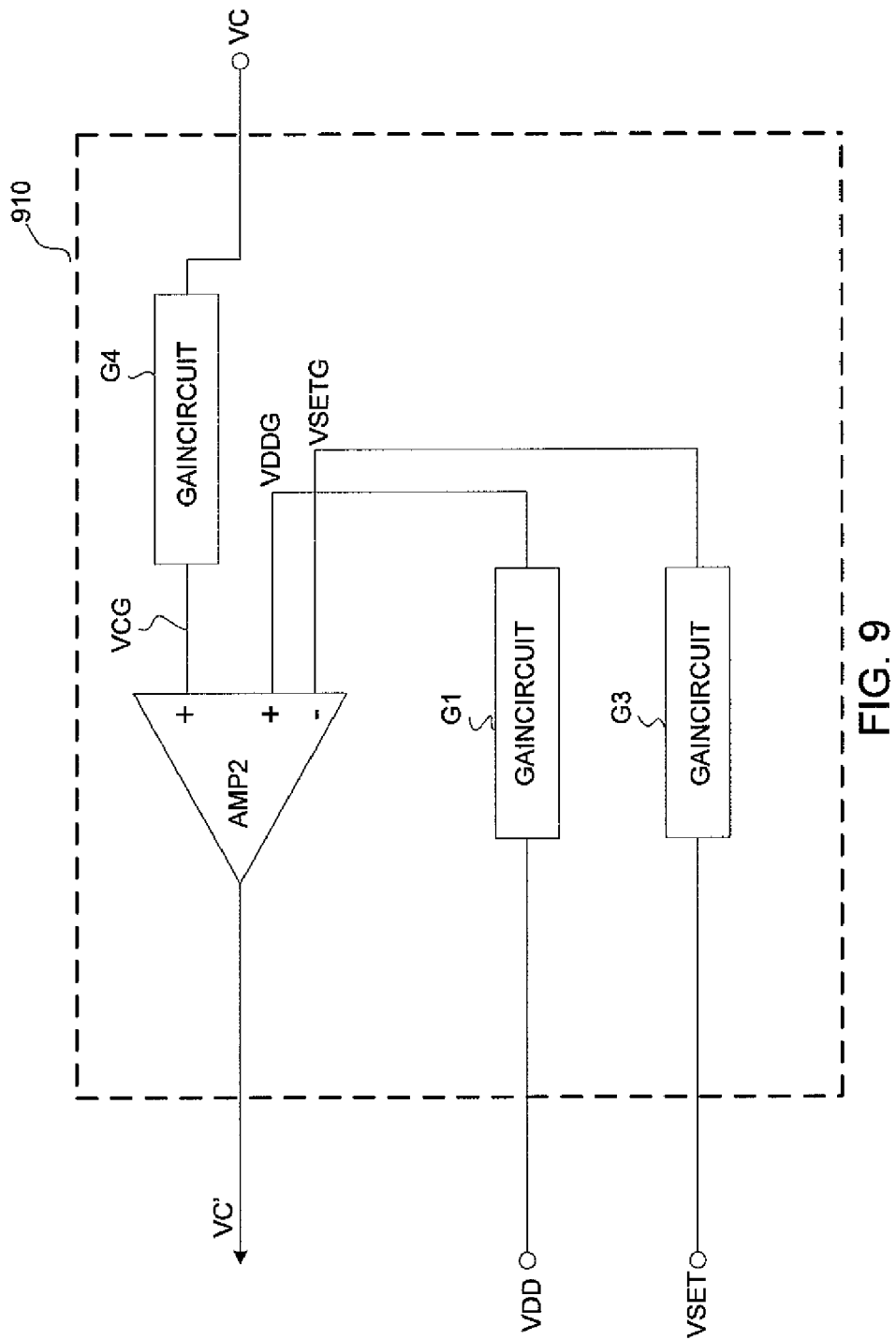
FIG. 9 is a schematic diagram of an illustrative embodiment of the feed-forward circuit of FIG. 8 according to aspects of the present invention.

FIG. 9 is a schematic diagram of an embodiment of feed-forward circuit 910. Feed-forward circuit 910 includes amplifier AMP2 and gain circuits G1, G3, and G4. Feed-forward circuit 910 may be employed as an embodiment of feed-forward circuit 810 of FIG. 8.

Gain circuits G1 and G3 may be employed as respective embodiments of gain circuits G1 and G3 of FIG. 3. Likewise, gain circuit G4 is arranged to provide scaled error signal VCG by multiplying error signal VC with constant K4. Gain circuit G4 may be any suitable gain circuits, such as those discussed above. In certain embodiments, one or more of gain circuits G1, G3, and G4 may be omitted.

Amplifier AMP2 is arranged to provide adjusted error signal VC' based, at least in part, on scaled error signal VCG, scaled power signal VDDG, and scaled set-point signal VSETG. In one embodiment, amplifier AMP2 is arranged to provide adjusted error signal VC' such that:

$$VC'=(VCG)+(VDDG)-(VSETG),$$

where in VDDG=(VDD*K1), VSETG=(VSET*K3), and VCG=(VC*K4). Accordingly, in this embodiment, feed-forward circuit 320 is arranged such that:

$$VC'=(VC*K4)+(VDD*K1)-(VSET*K3).$$

Any suitable circuit may be employed as amplifier AMP2. For example, operational amplifier circuits, summing amplifiers, level shifters, and/or the like, may be suitably employed.

In one illustrative embodiment, constants K1, K3, and K4 are predetermined constants. Each of constants K1, K3, and K4 may be less than one, greater than one, or substantially equal to one. In one embodiment, constants K1, K3, and K4 are predetermined based on the expected effect of a given change to input voltage VDD, set-point signal VSET, or error signal VC, on output voltage VOUT. For example, constants K1, K3, and K4 may be calculated by simultaneously solving multiple equations which define values of output voltage VOUT for various values of input voltage VDD and set-point signal VSET. In one embodiment, the multiple equations are solved to determine a switching regulator PWM duty cycle to produce a given value of output voltage VOUT.

In one illustrative embodiment, constants K1, K3, and K4 are calculated to minimizing the output disturbance on regulated output voltage VOUT resulting from a fixed step on input voltage VDD over a wide operating range for output voltage VDD. In one embodiment, a voltage step may be fixed at approximately 0.6 volts. However, in other embodiments, constants K1, K3, and K4 may be calculated to minimize disturbances for voltage step changes of any magnitude.

In one illustrative embodiment, constants K1, K3, and K4 are calculated to reduce the variance on error signal VC and to improve the output dynamic range of an error amplifier (such as error amplifier EA1 of FIG. 8) over a wide operating range for output voltage VDD.

Figure 10:
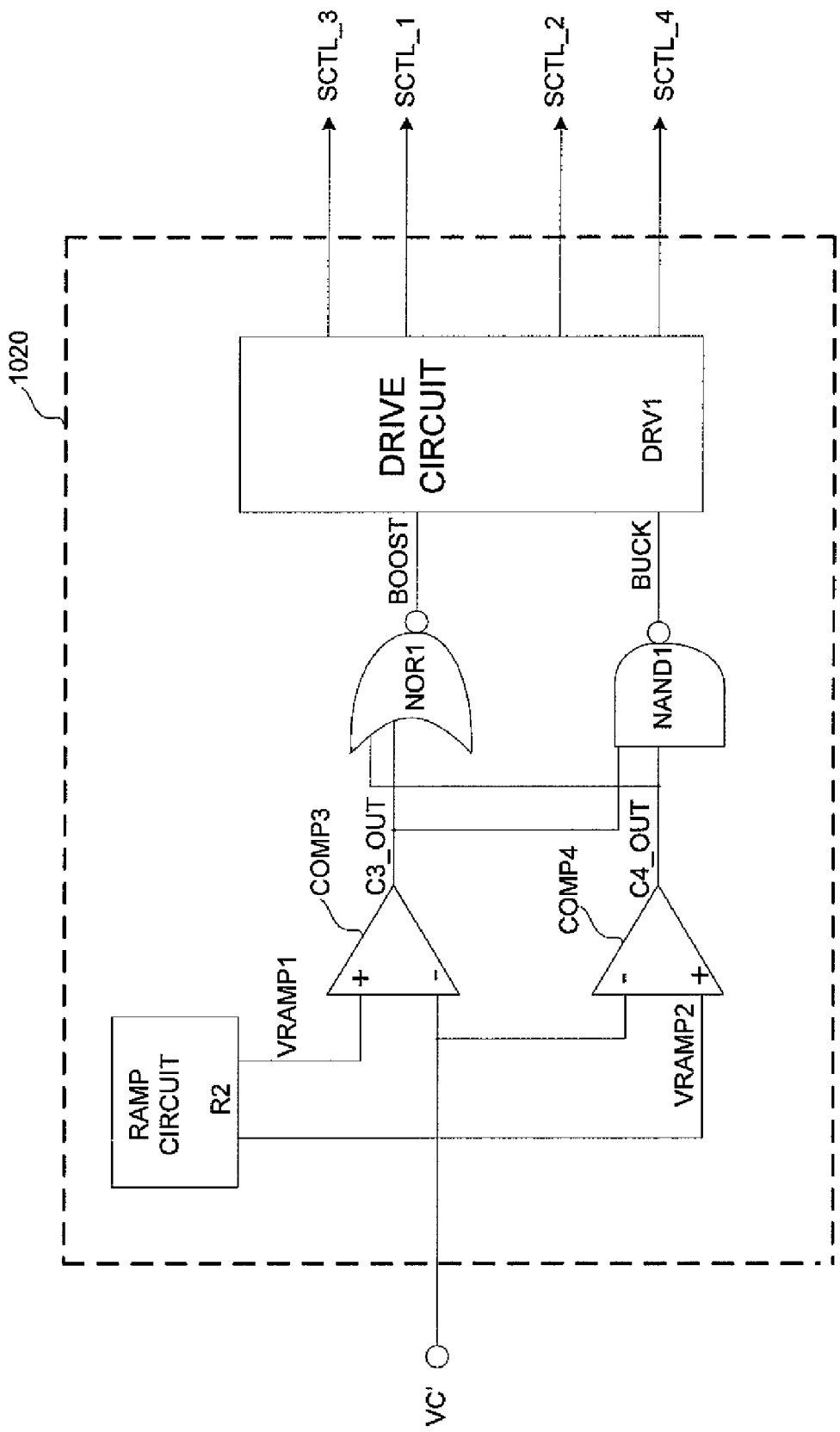
FIG. 10 is a block diagram of an illustrative embodiment of the control circuitry of FIG. 8 according to aspects of the present invention.

FIG. 10 is a block diagram of an embodiment of control circuitry 1020. Control circuitry 1020 includes ramp circuit R2, comparator COMP1, comparator COMP2, nor gate NOR1, nand gate NAND1, and drive circuit DRV1. Control circuitry 1020 may be employed as an embodiment of control circuitry 820 of FIG. 8.

Control circuitry 1020 is arranged to receive adjusted error signal VC' and to provide switch control signals SCTL1-SCTL4 based, at least in part, on adjusted error signal VC'. In one embodiment, output stage 630 of FIG. 6 may be employed in conjunction with control circuitry 1020 to regulated output voltage VOUT from input voltage VDD. However, in other embodiments, other output stages may be suitably employed.

In one illustrated embodiment, control circuitry 1020 is arranged as a portion of a PWM modulated buck/boost regulator controller. In one such embodiment, at any given time during operation, control circuitry 1020 controls either buck-mode or boost-mode operation. Further, during the transition period between the buck-mode operation and boost mode operation, control circuitry provides switch control signals SCTL_1-SCTL_4 such that switches M1 and M3 are closed, and switches M2 and M4 are open, and node IN is effectively coupled to node OUT via inductor L1.

In one illustrative embodiment, ramp circuit R1 is a modulation waveform generation circuit that generates ramp signals VRAMP1 and VRAMP2. For example, each of ramp signals VRAMP1 and VRAMP2 may be saw-tooth waveforms that linearly ramps from a value slightly greater than zero (e.g. 0.1 mV) to a maximum value related to the range of the control voltage and the desired minimum duty cycle. In one embodiment, ramp signals VRAMP1 and VRAMP2 are provided with a fixed amplitude and are approximately 180 degrees out of phase with respect to each other. In other illustrative embodiments, the modulation waveform generator may generate other waveforms suitable as a pulse width modulating waveform, such as a triangle wave, or the like. In yet other illustrative embodiments, other methods of PWM generation may be incorporated such as delta modulation, sigma-delta modulation, and digital modulation using counters.

Comparator COMP3 is arranged to assert (drive high) signal C3_OUT while ramp signal VRAMP1 is greater than adjusted error signal VC' and to de-assert (drive low) signal C3_OUT while ramp signal VRAMP1 is less than adjusted error signal VC'. Likewise, comparator COMP4 is arranged to assert (drive high) signal C4_OUT while ramp signal VRAMP2 is greater than adjusted error signal VC' and to de-assert (drive low) signal C4_OUT while ramp signal VRAMP2 is less than adjusted error signal VC'.

Comparators COMP3 and COMP4 may be any suitable comparison circuits. For example, high gain differential amplifiers, hysteretic comparators, differential amplifiers, and/or the like, may be suitably employed. In one embodiment, comparators COMP3 and/or comparator COMP4 includes trimming circuitry to provide timing compensation due to non-ideal phase shifting of ramp signals VRAMP1 and VRAMP2.

Nor gate NOR1 and nand gate NAND1 are arranged to provide regulation control signals BOOST and BUCK based, at least in part, on the output of comparators COMP3 and COMP4. As illustrated, regulation control signal BOOST is asserted (for example, to close boost low side switch M4) while signals C3_OUT and C4_OUT are both low to indicate that adjusted error signal VC' is greater than ramp signal VRAMP1 and is greater than ramp signal VRAMP2.

Also, regulation control signal BUCK is asserted (for example, to open buck high side switch M1) while signals C3_OUT and C4_OUT are both high to indicate that adjusted error signal VC' is less than ramp signal VRAMP1 and is less than ramp signal VRAMP2. However, in other embodiments, other logic levels and logic circuitry may be suitably employed.

Also, drive circuit DRV1 is operable to drive switches M1, M2, M3, and M4 based on signals BOOST and BUCK.

In one illustrative embodiment, control circuitry 1020 enables smooth transitions between buck-mode operation and boost-mode operation, and vice-versa, in a buck-boost regulator. Control circuitry 1020 may also be employed in a buck-boost regulator without a feed-forward circuit. In such an embodiment, control circuitry 1020 may be arranged to receive error signal VC from an error amplifier, and/or the like.

Figure 11:
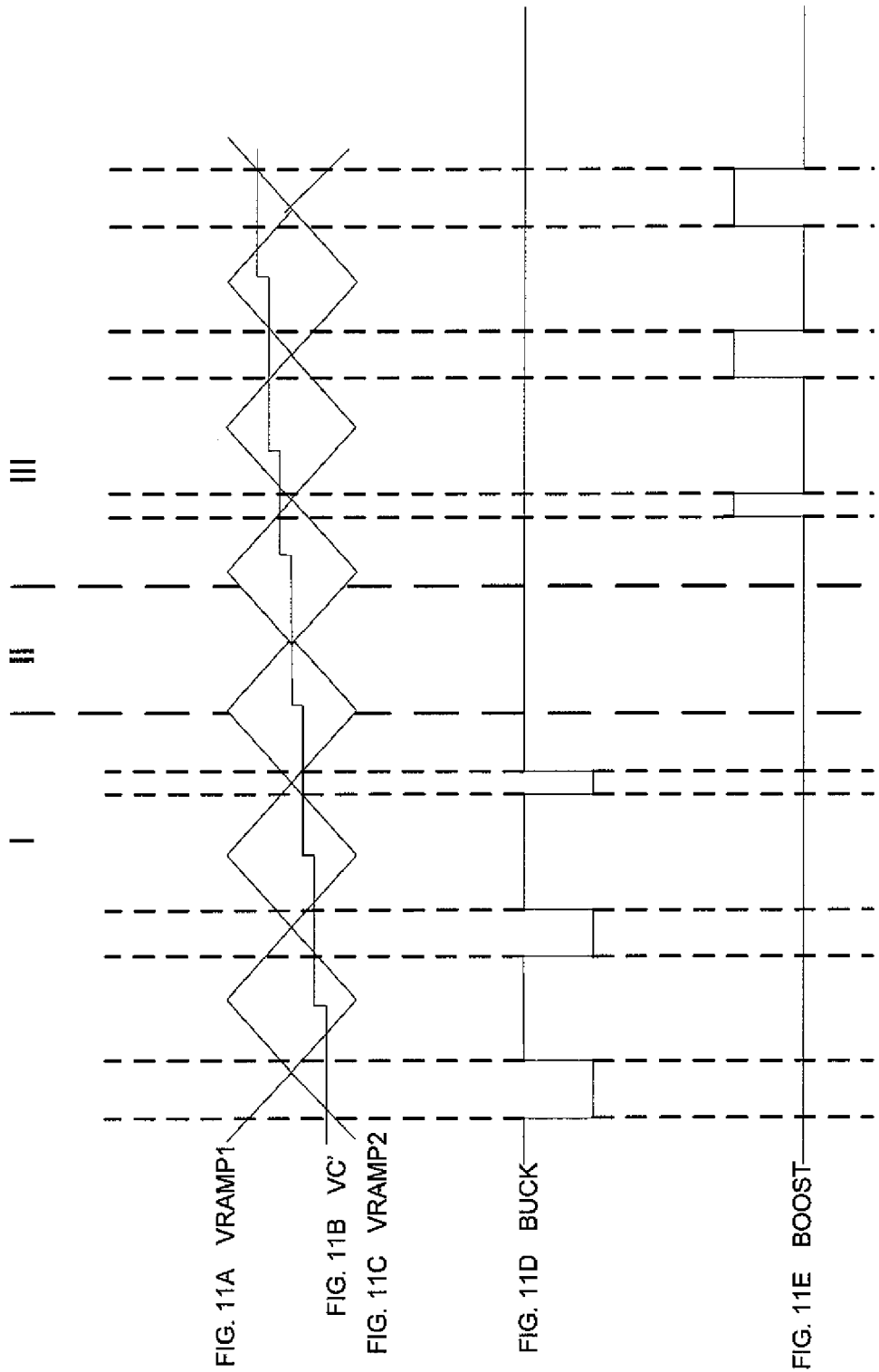
FIGS. 11A-11E are timing diagrams illustrating waveforms of embodiments of signals for an illustrative embodiment of the regulation system of FIGS. 8-10.

FIGS. 11A-11E shows a timing diagram of waveforms of embodiments of signals for an embodiment of the circuitry of FIGS. 8-10. Although FIGS. 11A-11E illustrate waveforms of particular embodiments of signals for one embodiment of the circuitry of FIGS. 8-10, the invention is not so limited. FIGS. 11A-11E are shown by way of example and illustration only. Other embodiments of circuitry having waveforms different than shown in FIGS. 11A-11E may be employed within the scope and spirit of the invention. FIG. 11A illustrates a timing diagram of a waveform an embodiment of ramp signal VRAMP1. FIG. 11C shows a timing diagram of a waveform an embodiment of ramp signal VRAMP2. FIG. 11B illustrates a timing diagram of a waveform an embodiment of adjusted error signal VC'. FIG. 11D shows a timing diagram of a waveform an embodiment of regulation signal BUCK. And, FIG. 11E shows a timing diagram of a waveform an embodiment of regulation signal BOOST.

In one embodiment, region I represents buck mode operation, region III represents boost mode operation, and region II represents the mode transition between buck mode and boost mode operation. As shown in FIGS. 11A-11E, buck mode occurs when adjusted error signal VC' is less than the intersection voltage value of ramp signals VRAMP1 and VRAMP2 (for example, the mid-point voltage of either of ramp signals VRAMP1 or VRAMP2). Also, boost mode occurs when adjusted error signal VC' is greater than the intersection of ramp signals VRAMP1 and VRAMP2, and the mode transition occurs when adjusted error signal VC is equal to the intersection of ramp signals VRAMP1 and VRAMP2.

When adjusted error signal VC' is substantially less than the intersection voltage, the duty cycle of regulation signal BUCK is relatively low as the percentage of time during which VC is less than both ramp signal VRAMP1 and ramp signal VRAMP2 is relatively long.

As adjusted error signal VC' rises to be substantially equal to the intersection voltage, the duty cycle of regulation signal BUCK rises until it is reaches 100%. The rise of regulation signal BUCK duty cycle to 100% corresponds to the increase of adjusted error signal VC' such that the percentage of time during which adjusted error signal VC' is less than both ramp signal VRAMP1 and ramp signal VRAMP2 decreases.

At this point the adjusted error signal VC' is substantially equal to the intersection voltage, the regulator reaches the buck-boost transition at region II.

During the buck-boost transition at region II, regulation signal BUCK has a duty cycle of approximately 100% and regulation signal BOOST has a duty cycle of approximately 0%.

As adjusted error signal VC' rises above the intersection voltage, the duty cycle of regulation signal BUCK remains at 100% as the duty cycle of regulation signal BOOST rises from 0%. In region III, the duty cycle of regulation signal BOOST is substantially equal to the percentage of time that adjusted error signal VC' is greater than both ramp signal VRAMP1 and ramp signal VRAMP2.

Although the pass-through condition (region II), is described as a mode transition, it is not necessarily the case that the regulator must transition to the opposite mode when region II is entered. For example, if the regulator is operating in region I, and later passes into region II, it is not necessarily the case that the regulator will transition into region III. It is also possible that the regulator may return to region I, and may then either remain in region I or oscillate back and forth between region I and II for a time. Further, for one embodiment, ramp signals VRAMP1 and VRAMP2 may be sawtooth signals instead of triangular signals.

Figure 12:
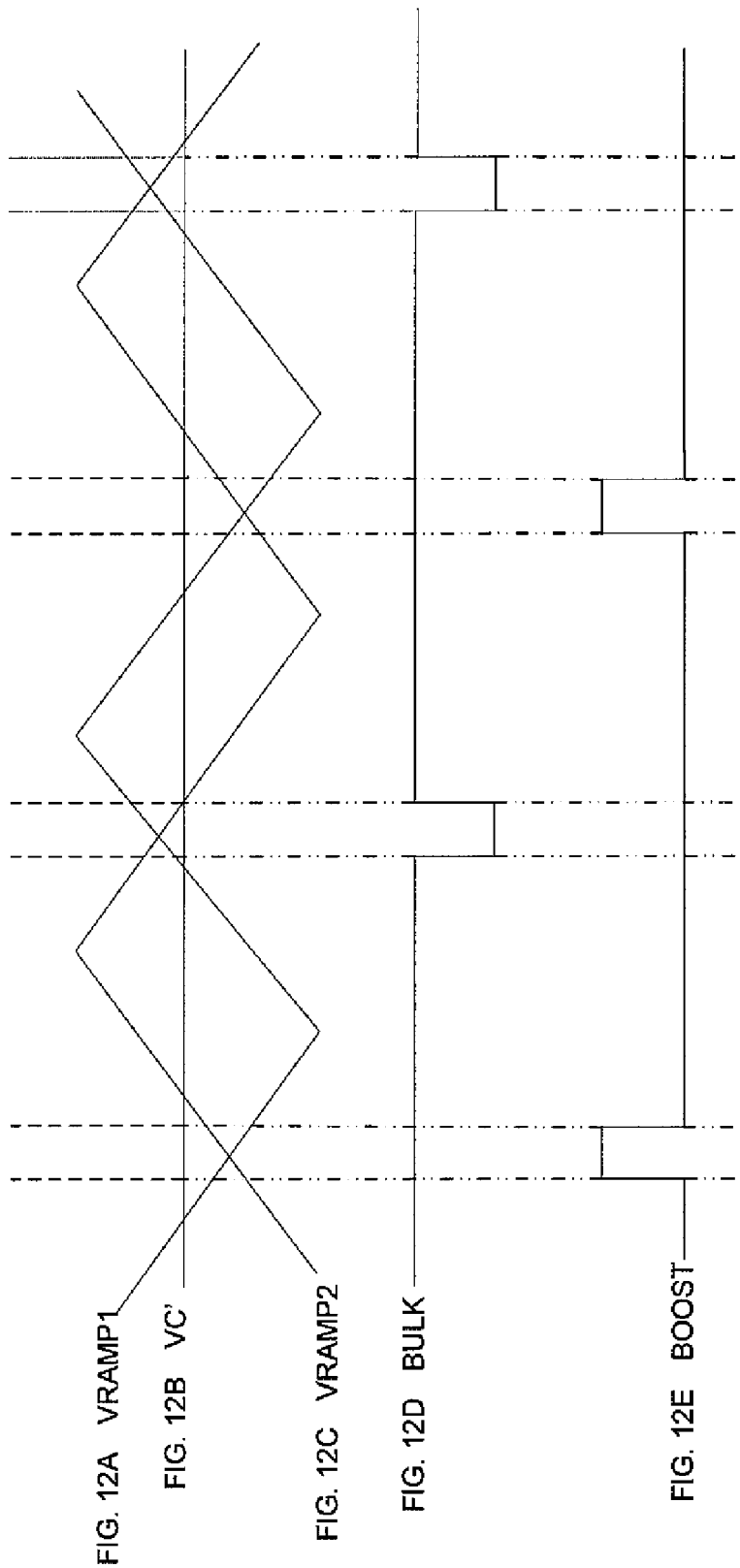
FIGS. 12A-12E are timing diagrams illustrating waveforms of illustrative embodiments of signals for an embodiment of the regulation system of FIGS. 8-10.

FIGS. 12A-12E shows a timing diagram of waveforms of embodiments of signals for an embodiment of the circuitry of FIGS. 8-10. Although FIGS. 12A-12E illustrate waveforms of particular embodiments of signals for one embodiment of the circuitry of FIGS. 8-10, the invention is not so limited. FIGS. 12A-12E are shown by way of example and illustration only. Other embodiments of circuitry having waveforms different than shown in FIGS. 12A-12E may be employed within the scope and spirit of the invention. FIG. 12A illustrates a timing diagram of a waveform an embodiment of ramp signal VRAMP1. FIG. 12C shows a timing diagram of a waveform an embodiment of ramp signal VRAMP2. FIG. 12B illustrates a timing diagram of a waveform an embodiment of adjusted error signal VC'. FIG. 12D shows a timing diagram of a waveform an embodiment of regulation signal BUCK. And, FIG. 12E shows a timing diagram of a waveform an embodiment of regulation signal BOOST.

FIGS. 12A-12E illustrate the operation of one embodiment of control circuitry 1020 during the mode transition between buck mode and boost mode operation of region II. In one embodiment, control circuitry 1020 is arranged to interleave buck-mode switching with boost mode-switching during the transition to further smooth the regulation of output voltage VOUT.

As illustrated, buck-mode switching is interleaved with boost mode switching during region II operation by providing a slight phase deviation from the 180 degree phase shift between ramp signal VRAMP1 and ramp signal VRAMP2. Such a phase deviation may cause the voltage level of the ramp signal VRAMP1 and ramp signal VRAMP2 intersection to change. In one embodiment, ramp signal VRAMP1 and ramp signal VRAMP2 intersect at a first voltage at every other intersection. Also, ramp signal VRAMP1 and ramp signal VRAMP2 intersect at a second voltage for each of the other intersections. In one embodiment, the first voltage is slightly different than the second voltage. Thus during transition mode, adjusted error signal VC is less than both ramp signal VRAMP1 and ramp signal VRAMP2 for a portion of one switching cycle and is greater than both ramp signal VRAMP1 and ramp signal VRAMP2 for a portion of the next switching cycle.

Figure 13:
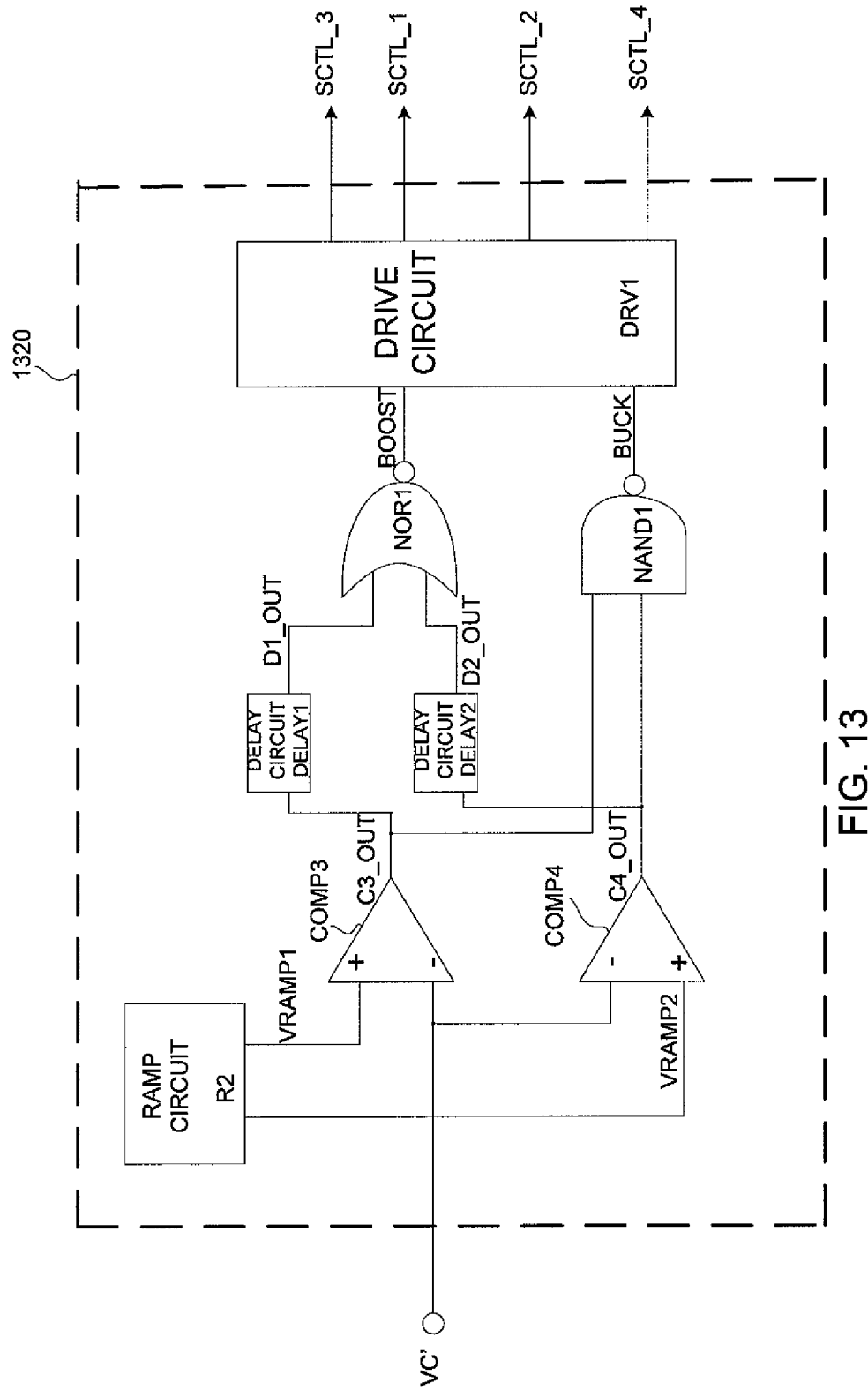
FIG. 13 is a block diagram of another illustrative embodiment of the control circuitry of FIG. 8 according to aspects of the present invention.

FIG. 13 is a block diagram of an embodiment of control circuitry 1320. Control circuitry 1320 includes ramp circuit R2, comparator COMP1, comparator COMP2, nor gate NOR1, nand gate NAND1, delay circuit DELAY1, delay circuit DELAY2, and drive circuit DRV1. Control circuitry 1320 may be employed as an embodiment of control circuitry 820 of FIG. 8.

In one illustrative embodiment, delay circuits DELAY1 and DELAY2 are operable as leading edge delay circuits. In this embodiment, rising edges of delayed signals D1_OUT and D2_OUT follow the respective rising edges of signals C3_OUT and C4_OUT by a delay period. However, the falling edges on delayed signals D1_OUT and D2_OUT follow the respective falling edges of signals C3_OUT and C4_OUT with substantially no delay. The rising edge delay provided by delay circuits DELAY1 and DELAY2 may be any suitable length and may be either fixed or adjustable and may be predetermined or calculated based on in-circuit operational parameters. In one embodiment, the length the delay period is configured such that there is buck-boost regulation overlap during the transition period. This buck-boost regulation overlap may enable buck-mode switching to be interleaved with boost-mode switching during the transition period in one embodiment.

In yet other illustrative embodiments, dynamic comparator offsets, static comparator offsets, filters, digital logic circuits, and/or the like, may also be employed to provide, during mode-transition, interleaved pulses on regulation signal BUCK and on regulation signal BOOST. These and other variations are within the spirit and scope of the invention.

Even though the above feed-forward and transition circuits and techniques were described with respect to the embodiments illustrated herein, the same feed-forward and transition circuits and techniques may be incorporated in multi-phase buck-boost converter or regulator topologies. For example, with reference to FIG. 6, the output circuit 630 may be extended to include additional banks of switches M1'-M4' (not shown) connected between the inputs to the block of circuit 630 and the OUT terminal in parallel with switches M1-M4 and sharing the same output capacitor COUT.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent of the United States is:

1. A circuit for regulating power, comprising:
    an error amplifier circuit that is arranged to receive a feedback signal, to receive a control signal, and to provide an error signal such that the error signal is based, at least in part, on a difference between the feedback signal and the control signal;
    a feed-forward circuit that is arranged to receive the error signal; to receive a feed-forward input signal; to level-shift the error signal based, at least in part, on the feed-forward input signal; and to provide the adjusted error signal based, at least in part, on the level-shift, wherein the feed-forward circuit is further arranged to provide feed-forward compensation of the adjusted error signal; and
    control circuitry that is arranged to receive the adjusted error signal and to control the regulation of an output signal.

2. The circuit of claim 1, wherein the control circuitry includes: buck-boost regulation circuitry.

3. The circuit of claim 1, wherein the feed-forward input signal is an input voltage.

4. The circuit of claim 1, wherein the feed-forward input signal is a user input signal.

5. The circuit of claim 1, further comprising:
    a reference voltage generator that is arranged to provide the control signal.

6. The circuit of claim 1, wherein the feed-forward circuit is further arranged to provide the adjusted error signal such that:

$$VC'=(FF\_IN*K1)+(VC*K2),$$

wherein VC' represents the adjusted error signal, FF_IN represents the feed-forward input signal, K1 represents a first scaling factor, VC represents the error signal, and K2 represents a second scaling factor.

7. The circuit of claim 1, wherein the feed-forward circuit is further arranged to multiply the feed-forward input signal by a first scaling factor, to multiply the error signal by a second scaling factor, and to adjust the error signal based on the multiplication of the feed-forward input signal by a first scaling factor and on the multiplication of the error signal by a second scaling factor.

8. The circuit of claim 7, wherein the at least one of the first scaling factor or the second scaling factor is one.

9. The circuit of claim 1, wherein the feed-forward circuit is further arranged to receive another feed-forward input signal, wherein the feed-forward input signal is an input voltage, and wherein said another feed-forward input signal is the control signal.

10. The circuit of claim 9, wherein the feed-forward circuit is further arranged to provide the adjusted error signal such that:

$$VC'=(VC*K4)+(VDD*K1)-(VSET*K3),$$

wherein VC' represents the adjusted error signal, VC represents the error signal, VDD represents an input voltage, VSET represents the control signal, K1 represents a first scaling factor, K3 represents a second scaling factor, and K4 represents a third scaling factor.

11. The circuit of claim 10, wherein the third scaling factor K4 is substantially equal to one.

12. The circuit of claim 1, further comprising:
    an output stage, including:
        a first transistor that is coupled between an input node and a first inductor node;
        a second transistor that is coupled between a ground node and the first inductor node;
        a third transistor that is coupled between an output node and a second inductor node; and
        a fourth transistor that is coupled between the ground node and the second inductor node.

13. The circuit of claim 12, wherein the output stage further comprises:
    an inductor that is coupled between the first inductor node and the second inductor node.

14. The circuit of claim 1, wherein the feed-forward circuit further comprises:
    a rectifier/splitter arranged to provide a first rectifier/splitter output signal and a second rectifier/splitter output signal, such that values of the first and the second rectifier/splitter output signals increase from zero and are each proportional to a departure of the error signal from a central value, and such that at most one of the values of the first and the second rectifier/splitter output signals departs from zero based on the error signal.

15. The circuit of claim 1, wherein the feed-forward circuit further comprises:
    a rectifier/splitter arranged to:
    provide a first rectifier/splitter output signal such that:
        if a value of the error signal is less than a first voltage level, a value of the first rectifier/splitter output signal is greater than zero and is substantially proportional to the value of the error signal;
        if the value of the error signal is greater than the first voltage level, the value of the first rectifier/splitter output signal is approximately zero; and
    provide a second rectifier/splitter output signal such that:
        if the value of the error signal is greater than a second voltage level, a value of the second rectifier/splitter output signal is greater than zero and is substantially proportional to the value of the error signal; and
        if the value of the error signal is less than the second voltage level, the value of the second rectifier/splitter output signal is approximately zero,
    wherein the second voltage level is greater than the first voltage level.

16. The circuit of claim 1, wherein the control circuit further comprises:
    a ramp circuit providing a first ramp signal and a second ramp signal, wherein the first and the second ramp signals are out of phase with respect to each other;

a first comparator having a first input coupled with the first ramp signal, a second input coupled with the adjusted error signal, and an output;

a second comparator having a first input coupled with the second ramp signal, a second input coupled with the adjusted error signal, and an output;

a first logic gate having a first input coupled with the output of the first comparator, and an output providing a boost signal; and a second logic gate having a first input coupled with the output of the second comparator, and an output providing a buck signal.

17. The circuit of claim 1, wherein the control circuit further comprises:

a ramp circuit providing a first ramp signal and a second ramp signal, wherein the first and the second ramp signals are 180 degrees out of phase with respect to each other, and wherein an intersection of the first and the second ramp signals corresponds with an intersection voltage; and a comparator circuit providing a boost signal and a buck signal, wherein the buck signal has a duty cycle substantially equal to 100% and the boost signal has a duty of cycle substantially equal to 0% (zero percent) if a value of the adjusted error signal substantially equals the intersection voltage.

18. The circuit of claim 1, wherein the control circuit further comprises:

a ramp circuit providing a first ramp signal and a second ramp signal, wherein the first and the second ramp signals have a phase shift different than 180 degrees with respect to each other, and wherein a first intersection of the first and the second ramp signals corresponds with a first intersection voltage, and a second intersection of the first and the second ramp signals corresponds with a second intersection voltage; and a comparator circuit, including a delay element, providing a buck signal and a boost signal, wherein a value of the adjusted error signal is less than the first intersection voltage for a first portion of a switching cycle of the circuit for regulating power and is greater than the second intersection voltage for a second portion of the switching cycle, and wherein the buck signal is active during the first portion of the switching cycle and the boost signal is active during the second portion of the switching cycle.

19. A circuit for regulating power, comprising:

an error amplifier circuit that is arranged to receive a feedback signal, to receive a control signal, and to provide an error signal such that the error signal is based, at least in part, on a difference between the feedback signal and the control signal;

a feed-forward circuit that is arranged to receive the error signal; to receive a feed-forward input signal; to level-shift the error signal based, at least in part, on the feed-forward input signal; and to provide the adjusted error signal based, at least in part, on the level-shift; and control circuitry that is arranged to receive the adjusted error signal and to control the regulation of an output signal, wherein the control circuitry is arranged to provide buck mode and boost mode regulation control.

20. The circuit of claim 19, wherein the feed-forward circuit is further arranged to provide feed-forward compensation of the adjusted error signal.

21. The circuit of claim 19, further comprising:

an output stage, including:

a first transistor that is coupled between an input node and a first inductor node;

a second transistor that is coupled between a ground node and the first inductor node;

a third transistor that is coupled between an output node and a second inductor node; and a fourth transistor that is coupled between the ground node and the second inductor node.

22. The circuit of claim 19, wherein the feed-forward circuit is further arranged to receive another feed-forward input signal, wherein the feed-forward input signal is an input voltage, and wherein said another feed-forward input signal is the control signal.

23. The circuit of claim 22, wherein the feed-forward circuit is further arranged to provide the adjusted error signal such that:

$$VC'=(VC*K4)+(VDD*K1)-(VSET*K3),$$

wherein VC' represents the adjusted error signal, VC represents the error signal, VDD represents an input voltage, VSET represents the control signal, K1 represents a first scaling factor, K3 represents a second scaling factor, and K4 represents a third scaling factor.

24. The circuit of claim 23, wherein the third scaling factor K4 is substantially equal to one.

25. The circuit of claim 19, wherein the feed-forward circuit further comprises:

a rectifier/splitter arranged to provide a first rectifier/splitter output signal and a second rectifier/splitter output signal, such that values of the first and the second rectifier/splitter output signals increase from zero and are each proportional to a departure of the error signal from a central value, and such that at most one of the values of the first and the second rectifier/splitter output signals departs from zero based on the error signal.

26. The circuit of claim 19, wherein the feed-forward circuit further comprises:

a rectifier/splitter arranged to:

provide a first rectifier/splitter output signal such that:

if a value of the error signal is less than a first voltage level, a value of the first rectifier/splitter output signal is greater than zero and is substantially proportional to the value of the error signal;

if the value of the error signal is greater than the first voltage level, the value of the first rectifier/splitter output signal is approximately zero; and provide a second rectifier/splitter output signal such that:

if the value of the error signal is greater than a second voltage level, a value of the second rectifier/splitter output signal is greater than zero and is substantially proportional to the value of the error signal; and if the value of the error signal is less than the second voltage level, the value of the second rectifier/splitter output signal is approximately zero, wherein the second voltage level is greater than the first voltage level.

27. The circuit of claim 19, wherein the control circuit further comprises:

a ramp circuit providing a first ramp signal and a second ramp signal, wherein the first and the second ramp signals are out of phase with respect to each other;

a first comparator having a first input coupled with the first ramp signal, a second input coupled with the adjusted error signal, and an output;

a second comparator having a first input coupled with the second ramp signal, a second input coupled with the adjusted error signal, and an output;

a first logic gate having a first input coupled with the output of the first comparator, and an output providing a boost signal; and a second logic gate having a first input coupled with the output of the second comparator, and an output providing a buck signal.

28. The circuit of claim 19, wherein the control circuit further comprises:
- a ramp circuit providing a first ramp signal and a second ramp signal, wherein the first and the second ramp signals are 180 degrees out of phase with respect to each other, and wherein an intersection of the first and the second ramp signals corresponds with an intersection voltage; and
- a comparator circuit providing a boost signal and a buck signal, wherein the buck signal has a duty cycle substantially equal to 100% and the boost signal has a duty of cycle substantially equal to 0% (zero percent) if a value of the adjusted error signal substantially equals the intersection voltage.

29. The circuit of claim 19, wherein the control circuit further comprises:
- a ramp circuit providing a first ramp signal and a second ramp signal, wherein the first and the second ramp signals have a phase shift different than 180 degrees with respect to each other, and wherein a first intersection of the first and the second ramp signals corresponds with a first intersection voltage, and a second intersection of the first and the second ramp signals corresponds with a second intersection voltage; and
- a comparator circuit, including a delay element, providing a buck signal and a boost signal, wherein a value of the adjusted error signal is less than the first intersection voltage for a first portion of a switching cycle of the circuit for regulating power and is greater than the second intersection voltage for a second portion of the switching cycle, and wherein the buck signal is active during the first portion of the switching cycle and the boost signal is active during the second portion of the switching cycle.

30. A method for regulating power, comprising:
- receiving a feedback signal;
- receiving a control signal;
- receiving a feed-forward input signal;
- providing an error signal such that the error signal is based, at least in part, on a difference between the feedback signal and the control signal;
- providing an adjusted error signal, including:
    - providing a feed-forward level-shift of the error signal based, at least in part, on the feed-forward input signal; and
    - providing feed-forward compensation of the adjusted error signal; and
- regulating an output signal based, at least in part, on the adjusted error signal.

31. The method of claim 30, further comprising:
- generating a first rectifier/splitter output signal and a second rectifier/splitter output signal, such that values of the first and the second rectifier/splitter output signals increase from zero and are each proportional to a departure of the error signal from a central value, and such that at most one of the values of the first and the second rectifier/splitter output signals departs from zero based on the error signal; and
- generating a buck signal and a boost signal based on at least one of the first and the second rectifier/splitter output signals.

32. The method of claim 30, further comprising:
- generating a first ramp signal and a second ramp signal, wherein the first and the second ramp signals are 180 degrees out of phase with respect to each other, and wherein an intersection of the first and the second ramp signals corresponds with an intersection voltage; and
- generating a boost signal and a buck signal, wherein the buck signal has a duty cycle substantially equal to 100% and the boost signal has a duty of cycle substantially equal to 0% (zero percent) if a value of the adjusted error signal substantially equals the intersection voltage.

33. The method of claim 30, further comprising:
- generating a first ramp signal and a second ramp signal, wherein the first and the second ramp signals have a phase shift different than 180 degrees with respect to each other, and wherein a first intersection of the first and the second ramp signals corresponds with a first intersection voltage, and a second intersection of the first and the second ramp signals corresponds with a second intersection voltage; and
- using a delay element to generate a buck signal and a boost signal, wherein a value of the adjusted error signal is less than the first intersection voltage for a first portion of a switching cycle for regulating power and is greater than the second intersection voltage for a second portion of the switching cycle, and wherein the buck signal is active during the first portion of the switching cycle and the boost signal is active during the second portion of the switching cycle.

\* \* \* \* \*

UNITED STATES PATENT AND TRADEMARK OFFICE
CERTIFICATE OF CORRECTION

PATENT NO. : 8,106,639 B1
APPLICATION NO. : 12/136010
DATED : January 31, 2012
INVENTOR(S) : Shu-Ing Ju et al.

It is certified that error appears in the above-identified patent and that said Letters Patent is hereby corrected as shown below:

On Page 2, in column 1, line 2, under "Other Publications", delete "IEEEApplied" and insert -- IEEE Applied --, therefor.

On Page 2, in column 1, line 3, under "Other Publications", delete "Converence" and insert -- Conference --, therefor.

On Page 2, in column 1, line 5, under "Other Publications", delete "AnnualPower" and insert -- Annual Power --, therefor.

On Page 2, in column 1, line 6, under "Other Publications", delete "Speialists" and insert -- Specialists --, therefor.

On Page 2, in column 1, line 11, under "Other Publications", delete "Electonics" and insert -- Electronics --, therefor.

In column 3, line 49, delete "EA 1" and insert -- EA1 --, therefor.

In column 8, line 64, delete "VC' 1." and insert -- VC'1. --, therefor.

Signed and Sealed this
Twenty-sixth Day of June, 2012

David J. Kappos
*Director of the United States Patent and Trademark Office*